US006840005B2

(12) United States Patent
Durand et al.

(10) Patent No.: US 6,840,005 B2
(45) Date of Patent: Jan. 11, 2005

(54) SYSTEM FOR TRAPPING FLYING INSECTS AND A METHOD FOR MAKING THE SAME

(75) Inventors: Emma A Durand, Jamestown, RI (US); Michael J Palombo, Warwick, RI (US)

(73) Assignee: American Biophysics Corporation, North Kingstown, RI (US)

( * ) Notice: Subject to any disclaimer, the term of this patent is extended or adjusted under 35 U.S.C. 154(b) by 0 days.

(21) Appl. No.: 10/264,260

(22) Filed: Oct. 4, 2002

(65) Prior Publication Data

US 2003/0084604 A1 May 8, 2003

Related U.S. Application Data

(60) Provisional application No. 60/326,722, filed on Oct. 4, 2001.

(51) Int. Cl.[7] .............................. A01M 1/06; A01M 5/08
(52) U.S. Cl. ........................................... 43/139; 43/107
(58) Field of Search ........................... 43/107, 139, 138, 43/133, 132.1

(56) References Cited

U.S. PATENT DOCUMENTS

| | | | |
|---|---|---|---|
| 1,693,368 A | 11/1928 | Cherry |
| 2,893,161 A | 7/1959 | Reid |
| 3,196,577 A | 7/1965 | Plunkett |
| 3,852,042 A | 12/1974 | Wagner |
| 4,421,095 A | 12/1983 | Kreis |
| 4,506,473 A | 3/1985 | Waters, Jr. |
| 4,519,776 A | 5/1985 | Deyoreo et al. |
| 4,608,774 A | 9/1986 | Sherman |
| 4,785,573 A | 11/1988 | Millard |
| 5,157,865 A | 10/1992 | Chang |
| 5,167,090 A | 12/1992 | Cody |
| 5,177,961 A | 1/1993 | Whittenberger |
| 5,189,830 A | 3/1993 | Montemurro |

(List continued on next page.)

FOREIGN PATENT DOCUMENTS

| | | |
|---|---|---|
| DE | 199 61 133 | 12/1999 |
| FR | 717903 | 1/1932 |
| JP | 1-14128 | 4/1989 |
| JP | 2-63679 | 5/1990 |

OTHER PUBLICATIONS

Grant et al., Electrophysiological responses of receptor neurons in mosquito maxillary palp sensilla to carbon dioxide, *J Comp Physiol A* 177:389–396 (1995).

(List continued on next page.)

*Primary Examiner*—Charles T. Jordan
*Assistant Examiner*—T. Nguyen
(74) *Attorney, Agent, or Firm*—Pillsbury Winthrop LLP

(57) ABSTRACT

A flying insect trapping device configured to be used with a fuel supply containing combustible fuel. The device may include a supporting frame; an insect trap chamber carried on the supporting frame; and a combustion device which may also be carried on the supporting frame. The combustion device comprises an inlet port for connection with the fuel supply, an exhaust port, and a combustion chamber communicating the inlet port with the exhaust port. The inlet port enables the fuel from the fuel supply to flow into the combustion chamber for continuous combustion therein to create an exhaust gas within the combustion chamber. The combustion device further includes a catalyst element disposed within the combustion chamber. The catalyst element has a catalyst body with a plurality of essentially linear elongated conduits for enabling the exhaust gas created in the combustion chamber to flow therethrough towards the exhaust port. The catalyst body includes a catalytically active material that, during operation, converts carbon monoxide in the exhaust gas to carbon dioxide as the exhaust gas flows through the elongated conduits. An insect inlet is communicated with the insect trap chamber to enable flying insects to enter the trap chamber through the insect inlet. A vacuum device communicated to the insect inlet is constructed and arranged to draw insects attracted to the exhaust outlet through the insect inlet and into the insect trap chamber.

67 Claims, 22 Drawing Sheets

U.S. PATENT DOCUMENTS

| | | | |
|---|---|---|---|
| 5,205,064 | A | 4/1993 | Nolen |
| 5,205,065 | A | 4/1993 | Wilson et al. |
| 5,255,468 | A | 10/1993 | Cheshire, Jr. |
| 5,301,458 | A | 4/1994 | Deyoreo et al. |
| 5,311,697 | A | 5/1994 | Cavanaugh et al. |
| 5,329,725 | A | 7/1994 | Bible |
| 5,382,422 | A | 1/1995 | Dieguez et al. |
| 5,417,009 | A | 5/1995 | Butler et al. |
| 5,595,018 | A | 1/1997 | Wilbanks |
| 5,647,164 | A | 7/1997 | Yates |
| 5,651,211 | A | 7/1997 | Regan et al. |
| 5,657,576 | A | 8/1997 | Nicosia |
| 5,669,176 | A | 9/1997 | Miller |
| 6,050,025 | A | 4/2000 | Wilbanks |
| 6,145,243 | A | 11/2000 | Wigton et al. |
| 6,286,249 | B1 | 9/2001 | Miller et al. |
| 2003/0154643 | A1 | 8/2003 | Spiro et al. |
| 2003/0154645 | A1 | 8/2003 | Spiro et al. |
| 2003/0208951 | A1 | 11/2003 | Bossler |

OTHER PUBLICATIONS

Sudia and Chamerlain, Journal of the American Mosquito Control Association 4:536–538, 1988.

PCT Search Report No. PCT/US 02/31550.

Peterson and Brown, "Studies of the responses of the female Aedes Mosquito. Part III. The response of the Aedes Aegypti (L.) to a warm body and its radiation," Biting Insect Technology, 1951, p. 535–541.

Carestia and Savage, "Effectiveness of carbon dioxide as a mosquito attractant in the CDC miniature light trap", J. American Mosquito Control Assn., vol. 27, No. 1, Mar. 1967, pp. 90–92.

SERVICE, "Mosquito Ecology Field Sampling Methods", ch. 5, Sampling adults by animal bait catches and by animal–baited traps, $2^{nd}$ ed., 1995, p. 349–498.

SERVICE, "Mosquito Ecology Field Sampling Methods", ch. 6, Sampling adults by carbon dioxide traps, light traps, visual attraction traps and sound traps, $2^{nd}$ ed., 1995, p. 499–610.

Floore et al., "Mosquito trapping studies to determine the efficacy of two models of the Flowtron® mosquito luring device", J. Florida anti–mosquito Assn., vol. 56, No. 1, 1985, p. 13–17.

Dipterian Collection Equipment Folder, American Biophysics Corporation.

Owner's manual, BugVac™ Model 1101 Electronic Insect Killer.

Kline, "Comparison of two American biophysics mosquito traps: the professional and a new counterflow geometry trap", J. American Mosquito Control Assn., vol. 15, No. 3, 1999, p. 276–282.

Butkett et al., "Light, carbon dioxide, and octenol–baited mosquito trap and host–seeking activity evaluations for mosquitos in a malarious area of the Republic of Korea", J. American Mosquito Control Assn., vol. 17, No. 3, 2001, p. 196–205.

Mosquito Ecology Field Sampling Methods, $2^{nd}$ Ed., 1993, pp. 500, 502, 517, 524 and 546–547.

Mosquito News, vol. 27, No. 1, Mar. 1967, p. 90–92.

Mboera et al., "Comparison of carbon dioxide–baited trapping systems for sampling outdorr mosquito populations in Tanzania", Medical and Veterinary Entomology (2000) 14, p. 257–263.

Catalytic Burner Literature, Teledyne Brown Systems, Jan. 1997.

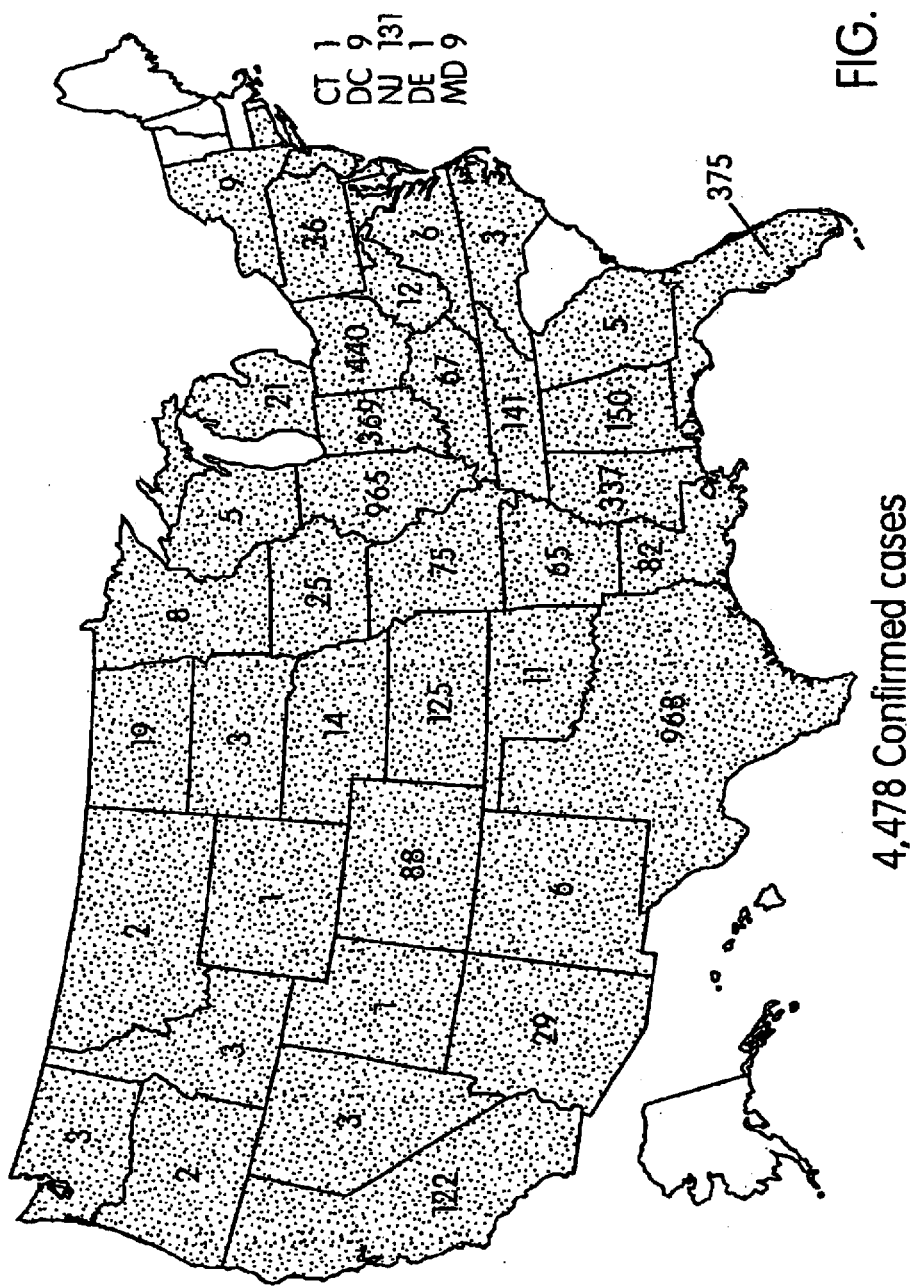

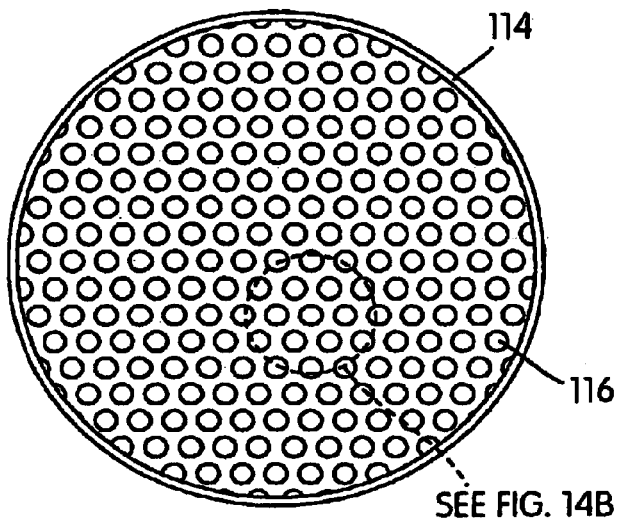
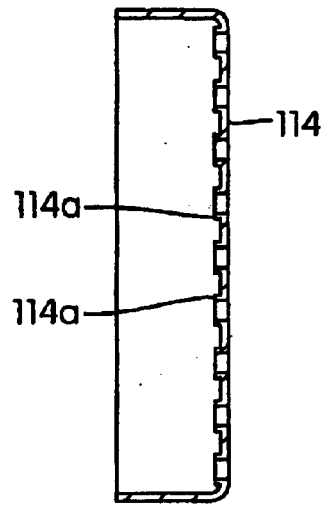
FIG. 14  FIG. 14A
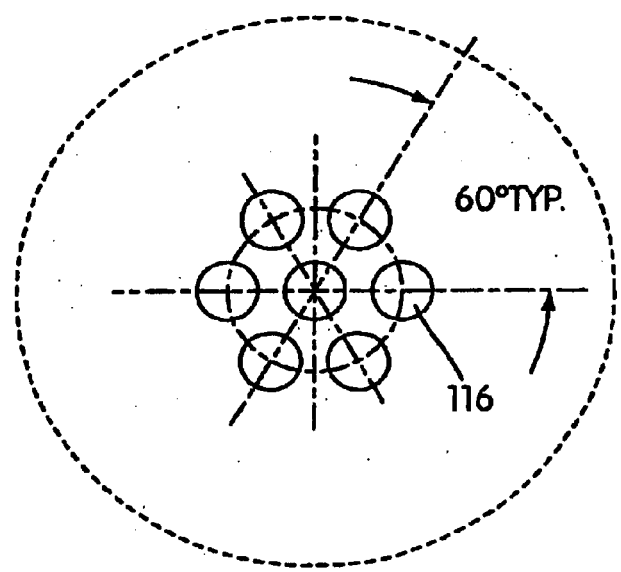
FIG. 14B

SYSTEM FOR TRAPPING FLYING INSECTS AND A METHOD FOR MAKING THE SAME

CROSS REFERENCE TO RELATED APPLICATIONS

This application claims priority to U.S. Provisional Application Ser. No. 60/326,722 (filed on Oct. 4, 2001), the entire contents of which are herein incorporated by reference.

BACKGROUND OF THE INVENTION

1. Field of the Invention

The present invention relates to a system for trapping flying insects, such as mosquitoes, no-see-ums, and other insects that are attracted to carbon dioxide emanating from mammals.

2. Description of Related Art

Each year mosquito-transmitted diseases are responsible for over 3 million deaths and 300 million clinical cases. It is estimated that the worldwide costs associated with the treatment of such mosquito-transmitted diseases runs well into the billions of dollars. In many regions mosquitoes are the primary transmitters of debilitating diseases such as malaria, yellow fever, dengue fever, encephalitis, West Nile virus, sleeping sickness, filariasis, typhus and plague. In addition to the illnesses and deaths caused to humans, mosquito-transmitted diseases are a major cause of economic losses to livestock industries due to veterinary diseases. Further, mosquito-transmitted diseases pose an ever-present concern to regions dependent on revenues from tourism. Specifically, the presence of such diseases in a given region is believed to impact the willingness of tourists to select that region as a tourism destination.

With increased travel and world commerce it also is expected that some of these diseases will become major health problems in the continental United States and elsewhere. For example, the emergence of the West Nile virus in temperate regions of Europe and North America supports this expectation, which represents a threat to public, equine and animal health. It can result in encephalitis (inflammation of the brain) in humans and horses, and mortality in domestic animals and wild birds.

In 1995, endemic cases of malaria were recorded in California and New Jersey, and several cases of dengue fever were diagnosed in southern Texas. In September 1996, an unprecedented number of mosquitoes were found in Rhode Island carrying Eastern Equine Encephalitis. Test results revealed that one out of 100 mosquitoes trapped were carrying this rare, deadly virus that has a mortality rate of 30%–60%. The situation in Rhode Island was so severe that the governor declared a state of emergency. In 1997, a similar situation occurred in Florida with an outbreak of St. Louis Encephalitis.

Dengue fever is a particularly dangerous mosquito-transmitted disease that is increasingly becoming a problem of global proportions and may soon eclipse malaria as the most significant mosquito-borne viral disease affecting humans. Dengue fever's global distribution is comparable to that of malaria, with an estimated 2.5 billion people living in areas at risk for epidemic transmission. Each year, millions of cases occur, and up to hundreds of thousands of cases of dengue hemorrhagic fever (DHF) are diagnosed. The case-fatality rate of DHF in most countries is about 5%, with most fatal cases occurring among children.

Until recently, dengue fever was relatively unknown in the Western Hemisphere. In the 1970's, a dengue epidemic swept through Cuba and other parts of the Caribbean. In 1981, a second serotype, which was accompanied by hemorrhagic fever, broke out in Cuba. That second epidemic resulted in more than 300,000 hemorrhagic fever cases, and more than 1,000 deaths, most of which were children. By 1986, other countries in South America and Mexico began to see a significant rise in dengue fever. The summer of 1998 saw a new outbreak on the island of Barbados.

With respect to the mainland Americas, nearly 24,000 cases of dengue fever were reported during the first eight months of 1995 in Central America, including 352 cases of hemorrhagic fever. El Salvador declared a national emergency due to the widespread infestation of this disease in that country in 1995. Even Mexico recorded approximately 2,000 cases in 1995, 34 of which included hemorrhagic fever. In total, the Pan American Health Organization reported that there have been almost 200,000 cases of dengue and more than 5,500 cases of hemorrhagic dengue fever in the Americas. FIG. 1A is provided to illustrate the worldwide distribution of dengue in the year 2000, and FIG. 1B is provided to illustrate the recent increase in dengue cases reported in the Americas.

Entomologists are very concerned about the increased threat of dengue fever to the United States. This concern is attributable in part to the presence of the recently arrived species of mosquito known as the *Aedes albopictus*. *Aedes albopictus* (also called the "tiger mosquito" due to its bright striping and aggressive biting) was first discovered in the United States in 1985 in Harris County, Tex. Historically, the tiger mosquito has been a major transmitter of dengue fever in Asia. However, it is believed that the introduction of the tiger mosquito in the United States can be traced to a shipment of old tires from Japan. In 1991, the Eastern Equine Encephalitis virus was discovered in groups of tiger mosquitoes found in a tire pile just 12 miles west of Walt Disney World in Orlando, Fla.

As of February 1996, established populations of the tiger mosquito have been documented in 24 states. Most alarming is that the tiger mosquito has now demonstrated the ability to survive in states as far north as Ohio, New Jersey, and Nebraska. Unlike the *Aedes aegypti*, the tiger mosquito's eggs can survive very cold winters. As a result, the tiger mosquito has great potential to carry diseases into a substantial portion of the United States. The tiger mosquito is already proving a nuisance and hazard in Pulaski County, Illinois, where bite counts of the insect were 25 per minute. In the Central region of the United States, this species has been linked to the transmission of La Crosse Encephalitis, an often fatal disease.

To illustrate the distribution of these mosquito-borne illnesses within the United States, attached FIGS. 1C through 1F are provided. FIG. 1C illustrates the distribution of confirmed and probable human LaCrosse encephalitis cases between 1964 and 1997 in the United States. FIG. 1D illustrates the distribution of human St. Louis Encephalitis cases between 1964 and 1998 in the United States; FIG. 1E illustrates the distribution of confirmed and probable human Western Equine Encephalitis cases between 1964 and 1997 in the United States; and FIG. 1F illustrates the distribution of confirmed and probable human Eastern Equine Encephalitis cases between 1964 and 1997 in the United States. As can be seen from these Figures, the distribution of these diseases is widespread throughout the United States, thus, leading to the present public concern over further spread of these diseases.

A number of methods for controlling mosquito populations or repelling mosquitoes have been proposed in the past.

Examples of these are discussed hereinbelow. As will be appreciated from the following discussion, each of these methods have significant drawbacks which render them impractical or ineffective.

One well-known method for suppressing mosquito populations is the use of chemical pesticides, such as DDT and Malathion. There are basically two types of mosquito pesticides available—adulticides and larvicides. Adulticides are chemicals used to kill mosquitoes that have developed to the adult stage. Infested areas are primarily sprayed from aircraft or motor vehicles. Efficacy of the sprayed chemicals is typically dependent upon wind, temperature, humidity, and time of day, the particular mosquito's resistance to the chemical used, and the base efficacy of the particular chemical. Adulticides must be applied for each generation of adults produced by rain, tidal flooding, or other periodic egg hatching trigger, and have a typical efficacy window of only ½ day. As such, these chemicals must be applied at a time when maximum contact with adult mosquitoes can be expected.

Larvicides, on the other hand, are applied to water sources to kill the larvae before they become adult mosquitoes. Larvicides generally take the form of one of three varieties: (1) an oil applied to the water surface that prevents the larvae from breathing and thus drowns them, (2) a bacteria, like BTI (bacillus thuringiensis israelensis), which attacks the larvae and kills them, or (3) a chemical insect growth regulator (e.g. methoprene) that prevents the larvae from developing to the adult stage. However, larvicides are often not particularly effective for a variety of reasons. For example, most larvicides have a short efficacy period and must be applied to the water while the immature mosquitoes are at a particular stage of growth. Also, several species of mosquitoes, such as tree-hole breeders, root-swamp breeders, and cattail-marsh breeders, are not easily controlled with larvicides since the larvae either do not come to the surface (e.g., cattail marsh mosquito) or the water sources are so difficult to locate that the larvicide's cannot be economically applied (e.g., tree holes). Additionally, the mosquito that carries the West Nile virus (Culex Pippiens) lives and breeds around humans in gutters, underground drains, flower pots, birdbaths, etc. This not only makes the spraying of insecticides impractical due to the difficulty associated with effectively targeting such areas, many people are also uncomfortable with the use of chemical pesticides so close to their homes.

Regardless of their alleged efficacy, or lack thereof, the use of chemical pesticides has been reduced dramatically in both the United States and worldwide. A primary reason for this reduction is attributable to the rising public awareness of the potential health hazards related to pesticide use. Specifically, general public perception of the long-term health hazards presented by certain chemicals, such as DDT, has led to the banning of their use for mosquito control in many parts of the United States and other countries. Additionally, increasing pesticide resistance among mosquitoes has reduced the effectiveness of the chemicals conventionally used, thus bolstering the argument that the supposed benefits of chemical pesticides do not outweigh public health risks.

To some extent, natural predators also control mosquito populations. For example, certain fish and dragonflies (as both nymphs and adults) are reported to be predacious to mosquito larvae and adults. Additionally, it is known that certain bats and birds also prey on mosquitoes. It has been advocated by some people, particularly those opposed to the use of chemical pesticides, that natural predators should be relied on as an environmentally safe means of controlling mosquito populations. Unfortunately, efforts in the past to utilize natural predators for effectively controlling mosquito populations have proven ineffective. For example, large bat towers were erected in three cities in the South during the 1920's with high expectations that the bats living in these towers would control mosquito populations. However, these towers were ineffective at adequately controlling the local mosquito populations. Studies of the stomach contents of the bats found that mosquitoes made up less than 1% of their food source.

Many people rely on repellents to keep mosquitoes away from their person, or from a certain area. These repellents by their nature do nothing to actually control the mosquito population; instead, they simply offer temporary relief to the person employing the repellent. Repellents can be either topical or aerial, and can take many forms, including lotions, sprays, oils (i.e. "Skin-So-Soft"), coils, and candles (e.g. citronella), among others. The most common repellents (lotions, sprays, and oils) are those that are used on the clothing or body. Many of these repellents do not actually "repel" mosquitoes per se—instead, some repellents simply mask the factors (carbon dioxide, moisture, warmth and lactic acid), which attract a mosquito to its host. Although these repellents are fairly inexpensive, they often have an offensive odor, are greasy, and are effective for only a limited duration. It has also been found that repellents, which contain DEET, or ethyl hexanediol, actually become attractive to mosquitoes after a period of time. Therefore, it is advisable when using repellents to wash them off or reapply fresh repellent when the protective period has passed.

In addition to being unpleasant, many repellents are coming under close scrutiny with respect to the potential long-term health hazards they may pose. DEET, considered by many entomologists to be the best repellent available, has been marketed for over 30 years, and is the primary ingredient of many well-known commercial sprays and lotions. Despite the long-term widespread use of DEET, the U.S. Environmental Protection Agency (EPA) believes that DEET may have the ability to cause cancers, birth defects, and reproductive problems. In fact, the EPA issued a consumer bulletin in August 1990 in which they stated that a small segment of the population may be sensitive to DEET. Repeated applications—particularly on small children—may sometimes cause headaches, mood changes, confusion, nausea, muscle spasms, convulsions or unconsciousness.

Mosquito coils have been sold for many years as a means for repelling mosquitoes. These coils are burnt to emit a repellent smoke. Products manufactured some 20 years ago were under the trade name Raid Mosquito Coils and contained the chemical Allethrin. Recent products are trade named OFF Yard & Patio Bug Barriers and contain the chemical Esbiothrin. These products may provide some relief from mosquito activity; however, they do not reduce the number of mosquitoes in a region, and they emit smoke and chemicals into the vicinity. Also, with even the slightest breeze, their potential effect is diminished, as the smoke and chemicals are dispersed over a large area and thus become diluted and less effective.

Many people have also touted the benefits of citronella in repelling mosquitoes, whether it is in the form of candles, plants, incense, or other mechanisms. According to a recent study, citronella-based products have been shown to be only mildly effective in repelling mosquitoes and then only when the candles were placed every three feet around a protected area. This treatment was only slightly more effective than burning plain candles around a protected area. In fact, it is believed that burning the candles increases the amount of carbon dioxide in the air, causing more mosquitoes to be drawn into the general area rather than reducing the number of mosquitoes in the area. Despite these drawbacks, the current market for citronella-based products is quite large.

Introduced in the late 1970's, the familiar "black-light" electrocution devices, referred to as "bug zappers," were initially a commercial success. Although totally ineffective at killing mosquitoes, bug zappers sell at a current rate of over 2,000,000 units annually. The inability of these devices to kill mosquitoes has been proven in academic studies and the personal experiences of many bug zapper owners. Specifically, electrocution devices do not kill mosquitoes because they do not attract most types of mosquitoes. The reason for this is that these devices only attract insects that are attracted to light, which is not the case with most types of mosquitoes.

U.S. Pat. No. 6,145,243 ("the '243 patent") discloses an insect trapping device developed by the assignee of the present application, American Biophysics Corporation of East Greenwich, R.I. The device of the '243 patent discloses the basic construction of a device that generates a flow of carbon dioxide for attracting mosquitoes and other flying insects towards an inlet on the device. A vacuum draws the insects attracted by the carbon dioxide through the inlet and into a trap chamber. The trap chamber includes a disposable mesh bag in which the mosquitoes become dehydrated. When the bag becomes full, it can be removed and replaced.

While the device disclosed in the '243 patent has been commercially successful for American Biophysics Corporation, further product development efforts by the inventors of the present application have yielded a number of improvements that are directed to reduce the manufacturing costs and operational efficiency of the device of the '243 patent. As a result of these improvements, the cost structure of the device of the present application can be reduced, thus making the technology more widely available to the average consumer. By making this technology available to more consumers, it is believed that the additive impact of widespread use of this technology will help lead to better control of mosquito and other flying insect populations and, in turn, to reduced incidents of insect transmitted diseases.

SUMMARY OF THE INVENTION

Turning now to the present invention, a first aspect of the present invention provides a flying insect trapping device having an advantageous catalyst element. The device is configured to be used with a fuel supply containing combustible fuel. The device comprises a supporting frame; an insect trap chamber carried on the supporting frame; and a combustion device carried on the supporting frame. The combustion device comprises an inlet port for connection with the fuel supply, an exhaust port, and a combustion chamber communicating the inlet port with the exhaust port. The inlet port enables the fuel from the fuel supply to flow into the combustion chamber for continuous combustion therein to create an exhaust gas within the combustion chamber. The combustion device further comprises a catalyst element disposed within the combustion chamber. The catalyst element has a catalyst body with a plurality of essentially linear elongated conduits for enabling the exhaust gas created in the combustion chamber to flow therethrough towards the exhaust port. The catalyst body includes a catalytically active material that, during operation, converts carbon monoxide in the exhaust gas to carbon dioxide as the exhaust gas flows through the elongated conduits.

An exhaust outlet is carried on the frame and is communicated with the exhaust port of the combustion device. The exhaust port allows the exhaust gas to flow outwardly through the exhaust outlet so that insects attracted to the carbon dioxide in the exhaust gas will fly towards the exhaust outlet. An insect inlet is communicated with the insect trap chamber to enable flying insects to enter the trap chamber through the insect inlet. A vacuum device communicated to the insect inlet is constructed and arranged to draw insects attracted to the exhaust outlet through the insect inlet and into the insect trap chamber.

The advantage of this aspect of the invention is the provision of the catalyst body with the plurality of essentially linear elongated conduits. This construction provides for an improved catalytic conversion over the specific preferred embodiment disclosed in the aforementioned '243 patent. Specifically, in the '243 patent, the catalyst element was provided by a series of catalyst-coated spheres loosely entrapped in a defined space. The problem with this arrangement is that consistency in the catalytic conversion reaction was difficult to achieve on a mass production basis. That is, the effectiveness of the catalytic conversion tended to vary between devices. It is believed that this is because using spheres caused a significant amount of turbulence in the air flowing therethrough and also loose packing of the spheres resulted in inconsistencies in the amount of catalytic surface area exposed to the exhaust gas. Much fine tuning of the proper fuel and air mixture was required to ensure that the carbon monoxide levels were maintained at a minimum in the commercial embodiment of the device disclosed in the '243 patent. Using the catalyst element mentioned above is believed to be an improvement over the construction of the device on the '243 patent because it provides for improved consistency in catalytic conversion between devices. This improvement, in turn, leads to reduced costs as it reduces and may even eliminate the need for fine tuning the fuel/air mixture.

In a preferred feature of this aspect of the invention, the combustion device further comprises turbulence reducing structure disposed within the combustion chamber upstream of said catalyst element. The turbulence reducing structure has a plurality of apertures oriented in the same general direction as the conduits of the catalyst body. The apertures are configured to straighten the flow of fuel from the inlet port to thereby reduce turbulence in the fuel. This is desirable to improve the consistency of the combustion operation. Specifically, in highly turbulent flow, "pockets" of fuel may be created which will pass through the combustion chamber unburned. This is undesirable because unburned fuel in the resultant exhaust gas is believed to be an insect repellent. By providing turbulence reducing structure, the flow's turbulence is thereby reduced and thus helps to minimize or eliminate the amount of unburned fuel in the exhaust gas.

In a further preferred feature of this first aspect of the invention, the turbulence reducing structure comprises a catalytically inactive body and the apertures of the turbulence reducing structure comprise a plurality of essentially linear elongated conduits formed therethrough for straightening the flow of the fuel from the inlet port. The conduits of this body are preferred for delivering a mostly laminar flow to the combustion point, which is desirable for the reasons discussed above. In a still even further preferred feature, the turbulence reducing structure further comprises a relatively thin diffuser positioned within the combustion chamber between the inlet port and the catalytically inactive body. The apertures of the turbulence reducing structure in this further preferred feature comprises a plurality of holes formed through the diffuser for initially straightening the flow of the fuel from the inlet port. The advantage of this diffuser plate is that it provides for an initial turbulence reduction of the fuel flow prior to reaching the inactive body. It should be understood that these preferred features are in no way intended to be limiting on this first aspect of the invention and are merely being mentioned as preferred features that may or may not be incorporated into a device constructed in accordance of this first aspect of the invention.

A second aspect of the present invention provides a flying insect trapping device having an advantageous heat exchange/combustion device. The device is configured to be used with a fuel supply containing combustible fuel. The device comprises a supporting frame; an insect trap chamber carried on the supporting frame; and a combustion/heat exchanger device. The combustion/heat exchanger device comprises a pair of halves each formed from a heat conducting material and each having a partial combustion chamber portion and a partial heat exchanger portion formed integrally together. The partial combustion chamber portions each have a partial combustion chamber formed therein and the partial heat exchanger portions each have a partial heat exchange path formed therein. The pair of halves of the combustion/heat exchanger device are coupled together such that (a) the partial combustion chamber portions are coupled to define a combustion chamber portion of the device and the partial combustion chambers are coupled to define a combustion chamber extending through the combustion chamber portion and (b) the partial heat exchanger portions are coupled to define a heat exchanger portion and the partial heat exchange paths are coupled to define a heat exchange path extending through the heat exchanger portion. The combustion chamber has an inlet port for connection to the fuel supply to enable the fuel to flow into the combustion chamber for continuous combustion to create an exhaust gas that includes carbon dioxide within the combustion chamber. The heat exchange path is communicated to the combustion chamber and has an exhaust port opposite the inlet port to enable the exhaust gas to flow through the heat exchange path to the exhaust port. The heat exchange portion is constructed such that the exhaust gas flowing out from the combustion chamber flows along the heat exchange path to the exhaust port and a temperature of the exhaust gas is reduced as the gas flows along the heat exchange path via conduction through the heat conductive material of the halves of the combustion/heat exchanger device.

An exhaust outlet is carried on the frame and is communicated with the exhaust port of the combustion/heat exchanger device. This allows the exhaust gas to flow outwardly therefrom so that insects attracted to the carbon dioxide in the exhaust gas will fly towards the exhaust outlet. An insect inlet is communicated with the insect trap chamber to enable flying insects to enter the trap chamber through the insect inlet. A vacuum device communicated to the insect inlet is constructed and arranged to draw insects attracted to the exhaust outlet through the insect inlet and into the insect trap chamber.

The advantage of this second aspect of the invention is the cost-savings and assembly time reduction achieved by using a combustion/heat exchanger device comprising a pair of halves as described above. Specifically, in comparison to the device disclosed in the '243 patent this construction reduces the number of parts and the assembly time required during manufacturing. The device disclosed in the '243 patent, while functioning effectively, has a high part count and its assembly steps are likewise relatively time consuming. The provision of the combustion/heat exchanger device as described above greatly reduces the part count and therefore the corresponding assembly time, which leads to a lower overall cost structure for the device.

Other objects, features, and advantages of the present invention will become apparent from the following detailed description, the accompanying drawings, and the appended claims.

BRIEF DESCRIPTION OF THE DRAWINGS

FIG. 1D illustrates the distribution of confirmed and probable human St. Louis encephalitis cases between 1964 and 1998 in the United States;

FIG. 14 is an end view of the diffuser plate used in the sleeve of FIG. 11;

FIG. 14A is a cross-section of the diffuser plate taken along line C—C of FIG. 14 and FIG. 14B is an isolated view of subject matter shown in FIG. 14A;

DETAILED DESCRIPTION OF A PREFERRED EMBODIMENT OF THE INVENTION

Figure 1A:
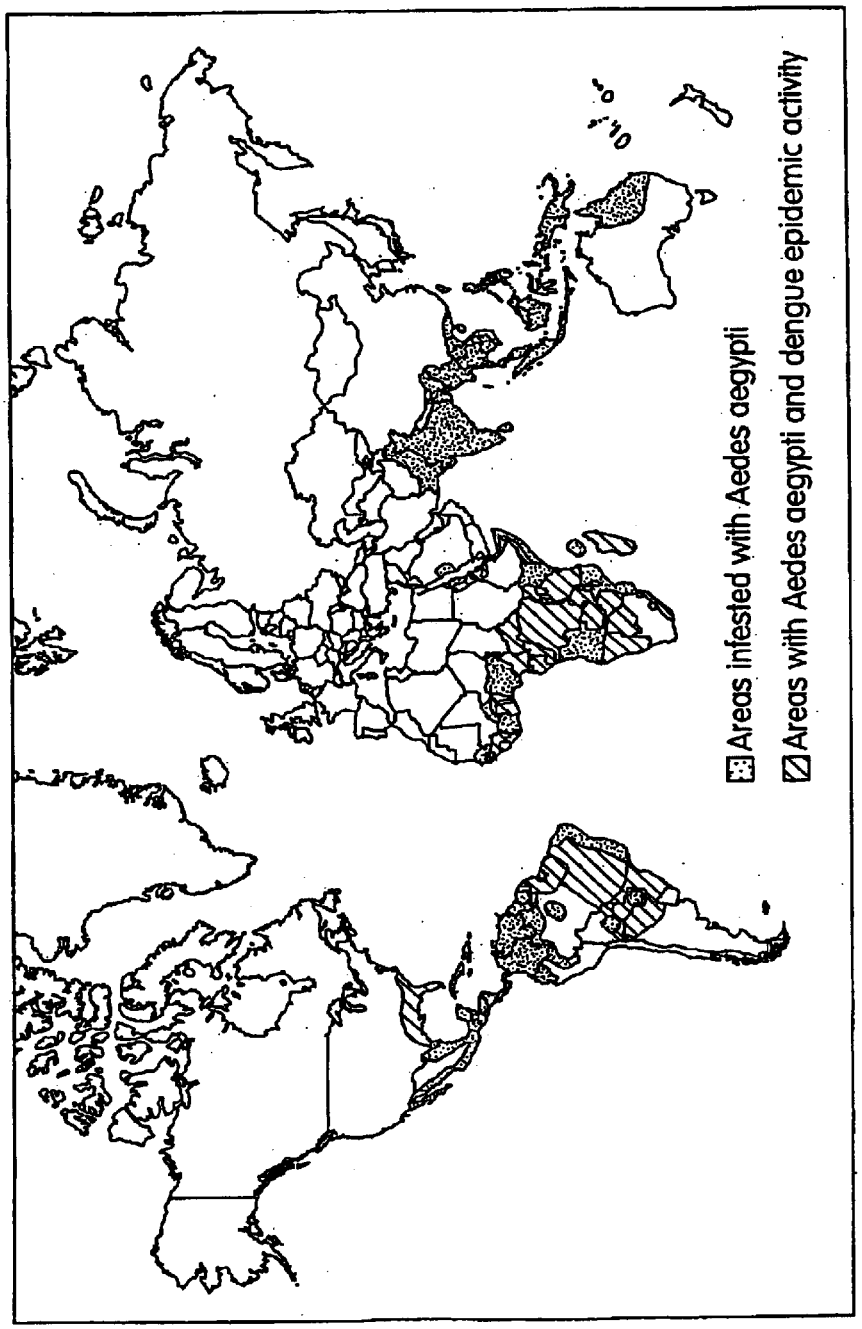
FIG. 1A illustrates the distribution of dengue fever throughout the world in the year 2000.
Figure 1B:
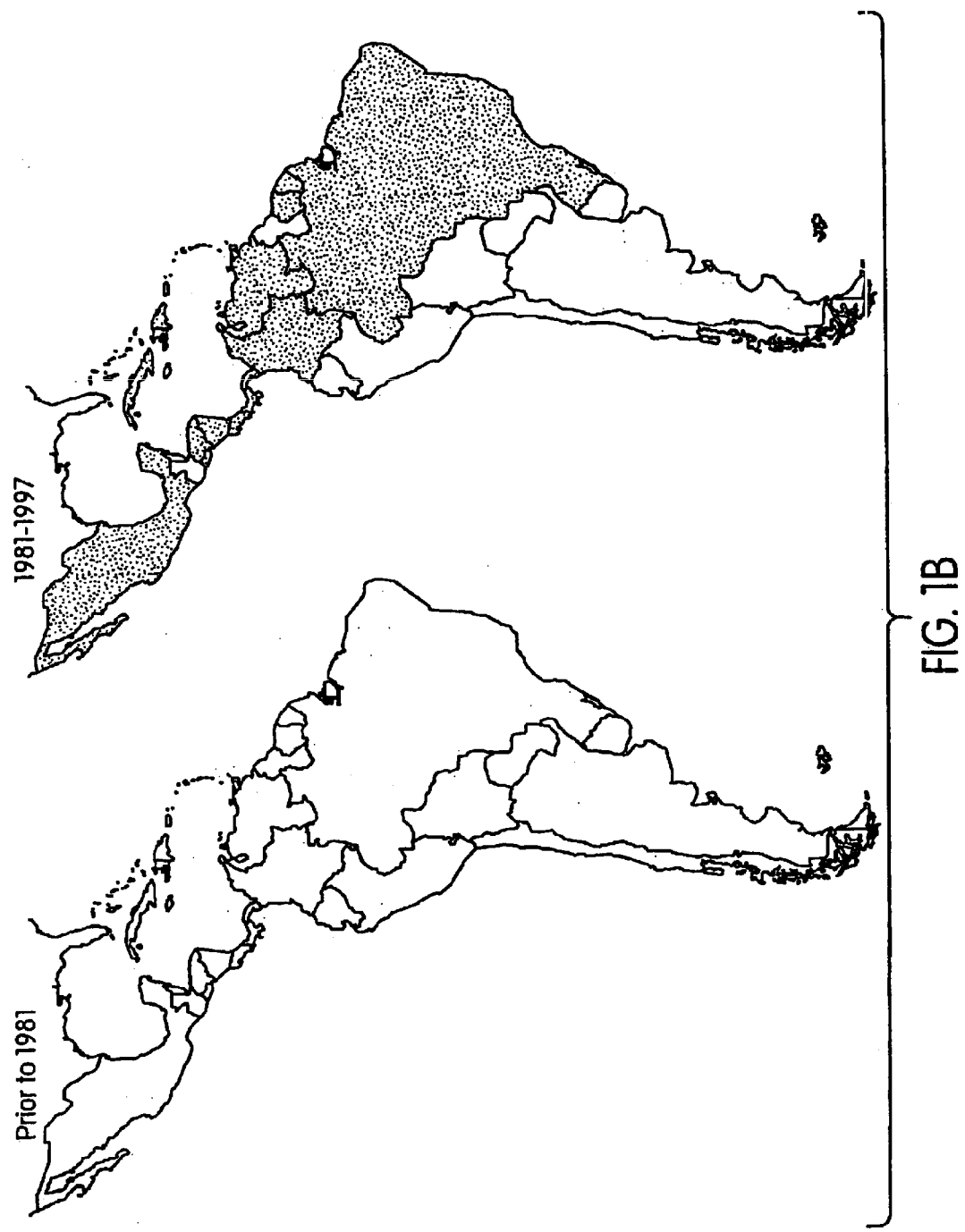
FIG. 1B is a comparative illustration of the recent increase of dengue fever incidents in the Americas.
Figure 1C:
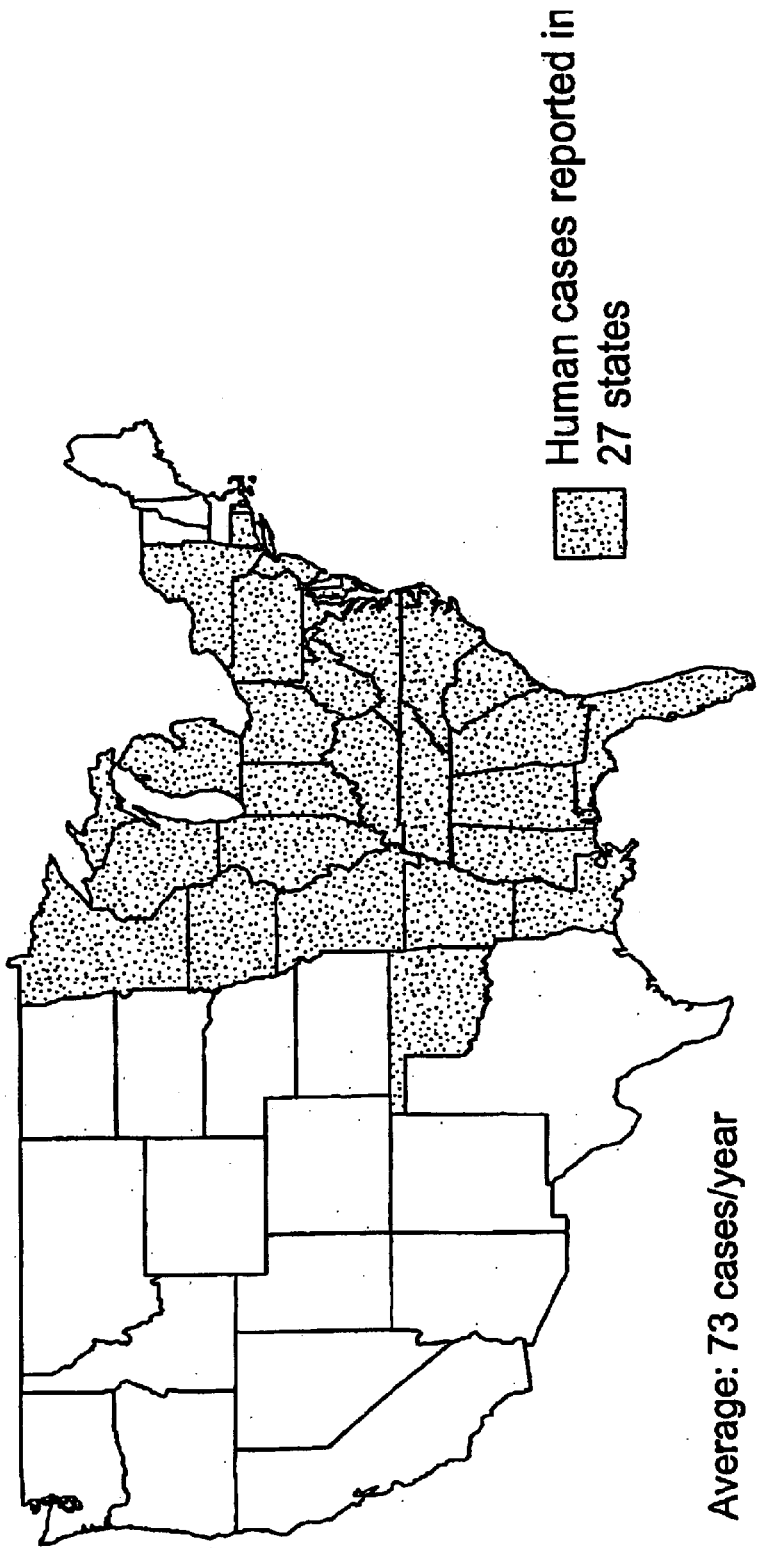
FIG. 1C illustrates the distribution of confirmed and probable human LaCrosse encephalitis cases between 1964 and 1997 in the United States.
Figure 1E:
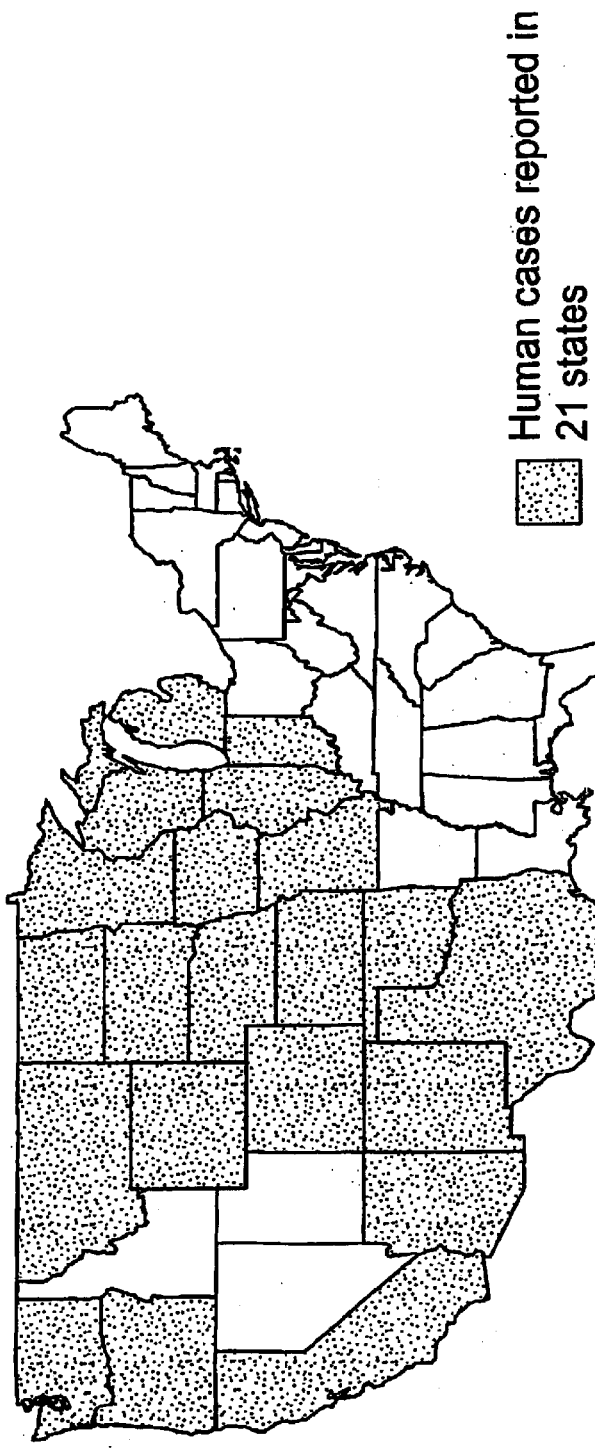
FIG. 1E illustrates the distribution of confirmed and probable human Western equine encephalitis cases between 1964 and 1997 in the United States.
Figure 1F:
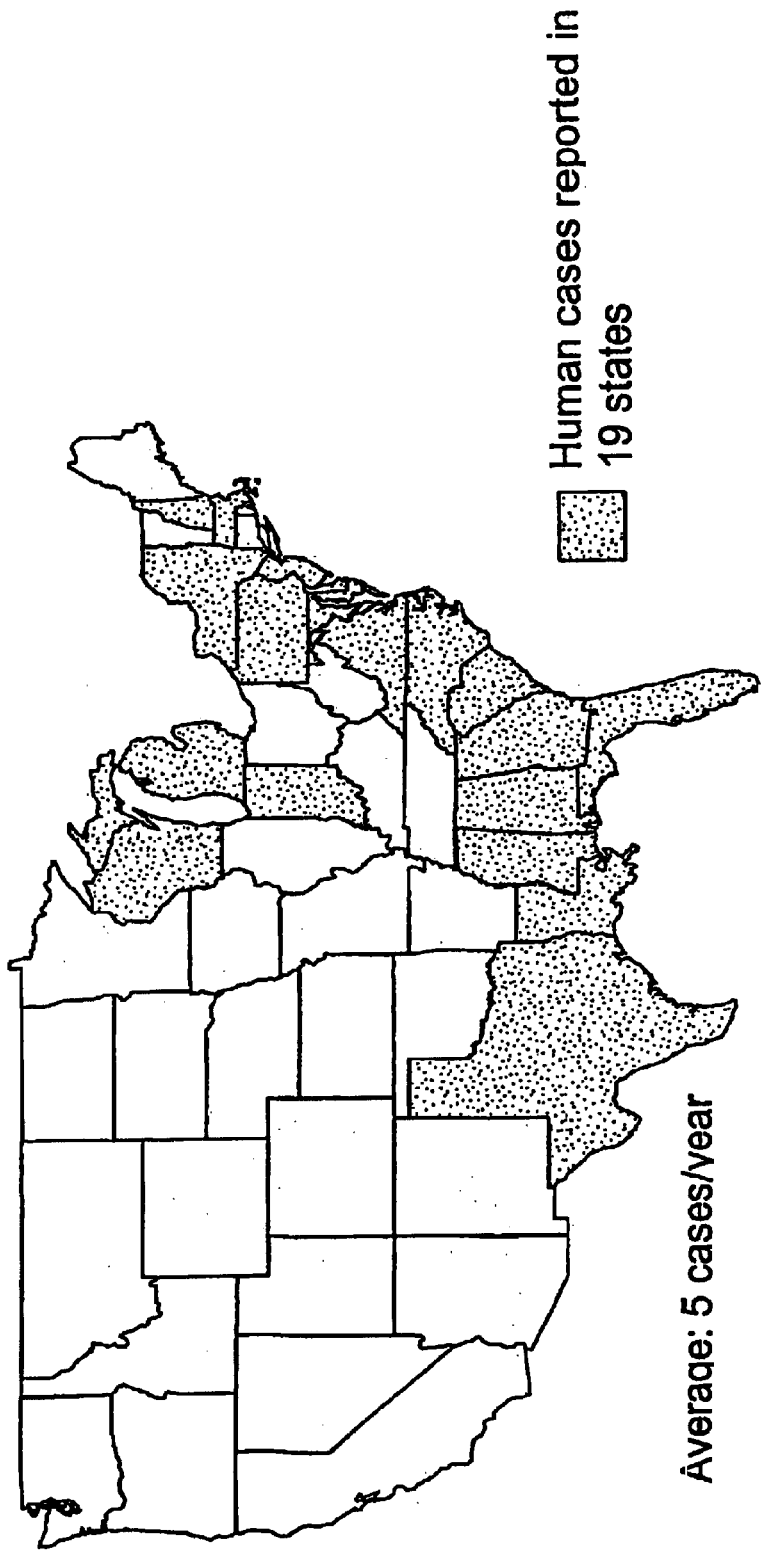
FIG. 1F illustrates the distribution of confirmed and probable human Eastern equine encephalitis cases between 1964 and 1997 in the United States.
Figure 2:
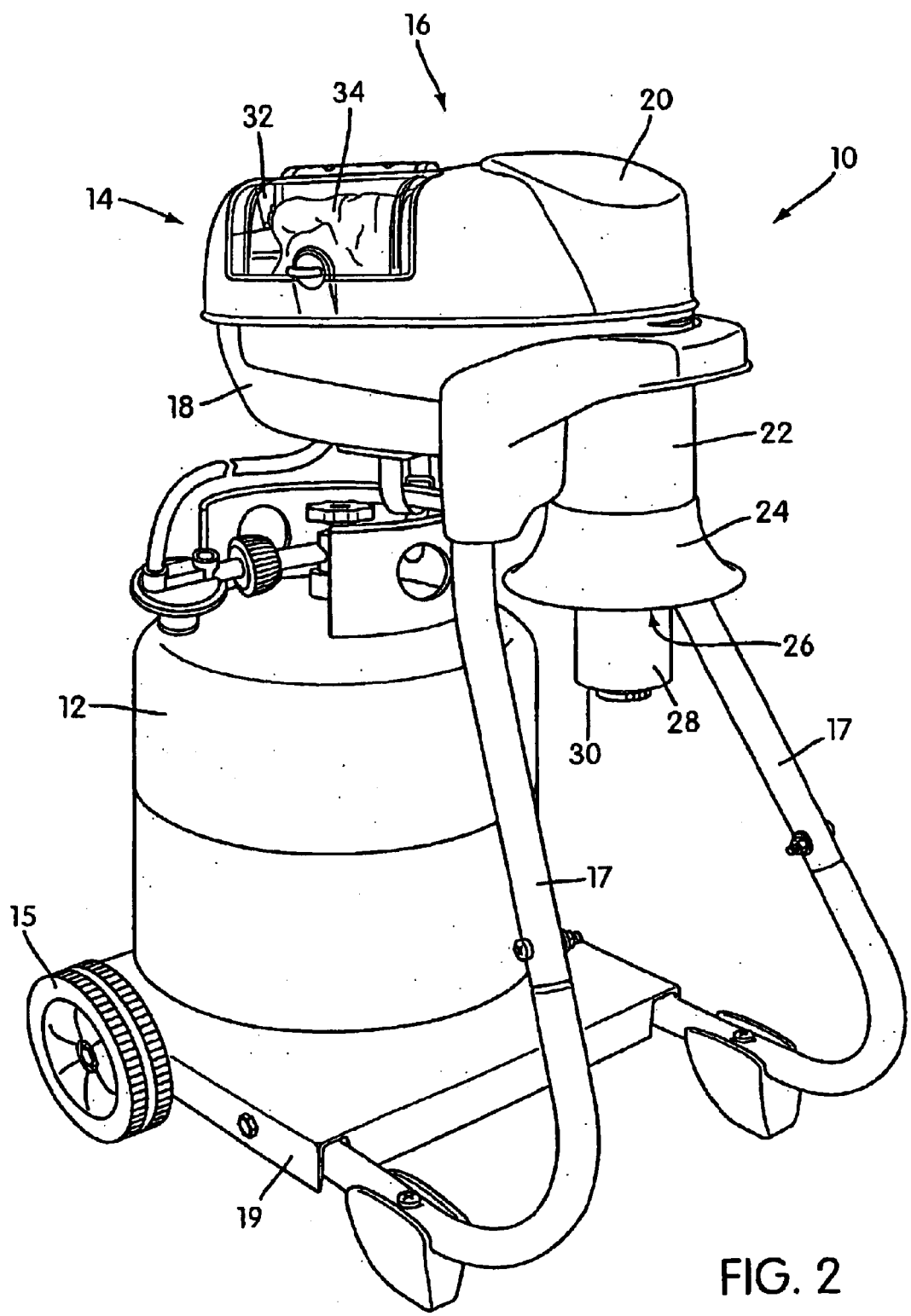
FIG. 2 is a perspective view of a device constructed in accordance with the principles of the present invention.

FIG. 2 is a perspective view of an exemplary flying insect trapping device, generally indicated at 10, constructed in accordance with the present invention. The device 10 is designed to be used with a supply of combustible fuel, such as a propane tank 12 of the type conventionally used by consumers for supplying fuel to a barbecue grill. Broadly speaking, the general function of the device 10 is to emit an exhaust gas with an increased carbon dioxide content to attract mosquitoes and other flesh biting insects that are attracted to carbon dioxide. Then, an inflow, draws the attracted insects into a trap chamber within the device, whereat the insects are captured and killed by poison or dehydration/starvation. Alternatively, a user engaged in the study of insects may opt to not kill the captured insects and instead may remove them from the device 10 prior to dying for purposes of live examination. Regardless of the specific insect capturing purpose the user has in mind, the overall function of the device 10 is to attract and capture flying insects. The specifics of how the present invention operates to achieve this broad general function is discussed hereinbelow.

The device 10 comprises a supporting frame structure, generally indicated at 14. The supporting frame structure 14 includes a housing 16 supported on a set of legs 17. In the illustrated embodiment, two legs 17 are used to support the housing 16. The supporting frame structure 14, however, may have any construction or configuration suitable for carrying the operative components discussed herein below, for example a tripod arrangement may also be used. Additionally, the frame may include wheels 15, as shown in FIG. 2 and the aforementioned U.S. Pat. No. 6,145,243, the entirety of which is hereby incorporated into the present application by reference. Further, the supporting frame structure 14 may also include a supporting deck 19 for carrying the propane tank 12, so that the tank 12 and device 14 can be transported together as a unit, as is also shown in FIG. 2 and the '243 patent.

The housing 16 includes a bottom shell 18 and a top shell 20 mounted thereto. The shells 18 and 20 are coupled and secured together using conventional fasteners, adhesives, a snap-fit relation, or in any other suitable manner. In the illustrated embodiment, these shells 18 and 20 are molded from plastic; however, these shells 18, 20, and the housing 16 in general, may be made from any materials and may take any shape, configuration, or construction.

A tubular intake nozzle 22 protrudes downwardly from the bottom shell 18 and is formed integrally therewith. The intake nozzle 22 has a flared lower end 24 which is attached by fasteners or snap-fitting to, and thus forms a part of, the intake nozzle 22. The flared lower end 24 defines an insect inlet 26. As will be appreciated from the details provided hereinbelow, a vacuum is applied to the nozzle 22 and the insects attracted to the carbon dioxide emanated by the device 10 will be drawn into the insect inlet 26 for capture. The intake nozzle 22 and the inlet 26 provided thereby may be carried on the supporting frame structure 14 in any suitable matter and the construction illustrated and described is only an exemplary construction. Thus, other configurations may be used.

Figure 3:
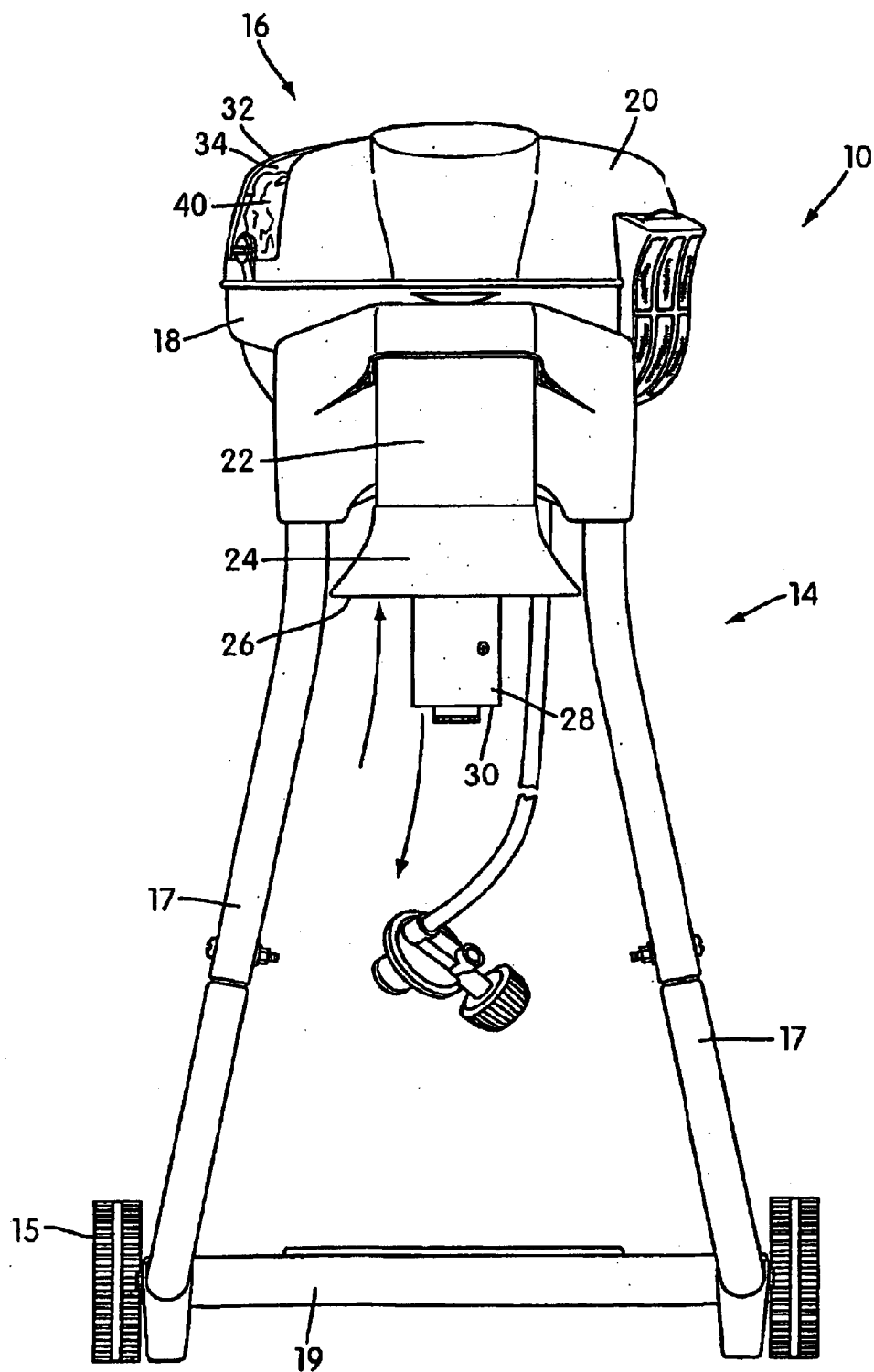
FIG. 3 is a front elevational view of the device of FIG. 2.

Concentrically mounted within the intake nozzle 22 is an outlet nozzle 28. The outlet nozzle 28 provides an exhaust outlet 30 on the lower end thereof. The function of the outlet nozzle 28 and its exhaust outlet 30 is to allow a "plume" of exhaust gas comprising carbon dioxide to flow outwardly and downwardly therefrom. As the downward flow of the exhaust gas reaches the ground, it flows radially outwardly from the device 10 along the ground. Mosquitoes and other insects attracted to carbon dioxide away from the device 10 will be able to sense this radiated plume of carbon dioxide and follow the same to its source, namely the exhaust outlet 30. As can be appreciated from the construction disclosed, because the outlet nozzle 28 is concentric with the intake nozzle 22, the attracted insects will follow the carbon dioxide to its source (i.e., the outlet 30) and thus they will be immediately adjacent the insect inlet 26 upon reaching the outlet 30. As a result, the attracted insects will fly directly into the vacuum zone created by the vacuum communicated to the intake nozzle 22 and its insect inlet 26 whereby they are drawn into the device 10 and captured therein. The respective flows of the vacuum intake and the exhaust gas outflow are indicated by the inflow and outflow arrows in FIG. 3. For further details and variations on this aspect of the disclosed construction, reference may be made to the above-incorporated '243 patent. Also, reference may be made to U.S. Pat. No. 6,286,249 filed Sep. 17, 1996, the entirety of which is hereby incorporated into the present application by reference.

Figure 4:
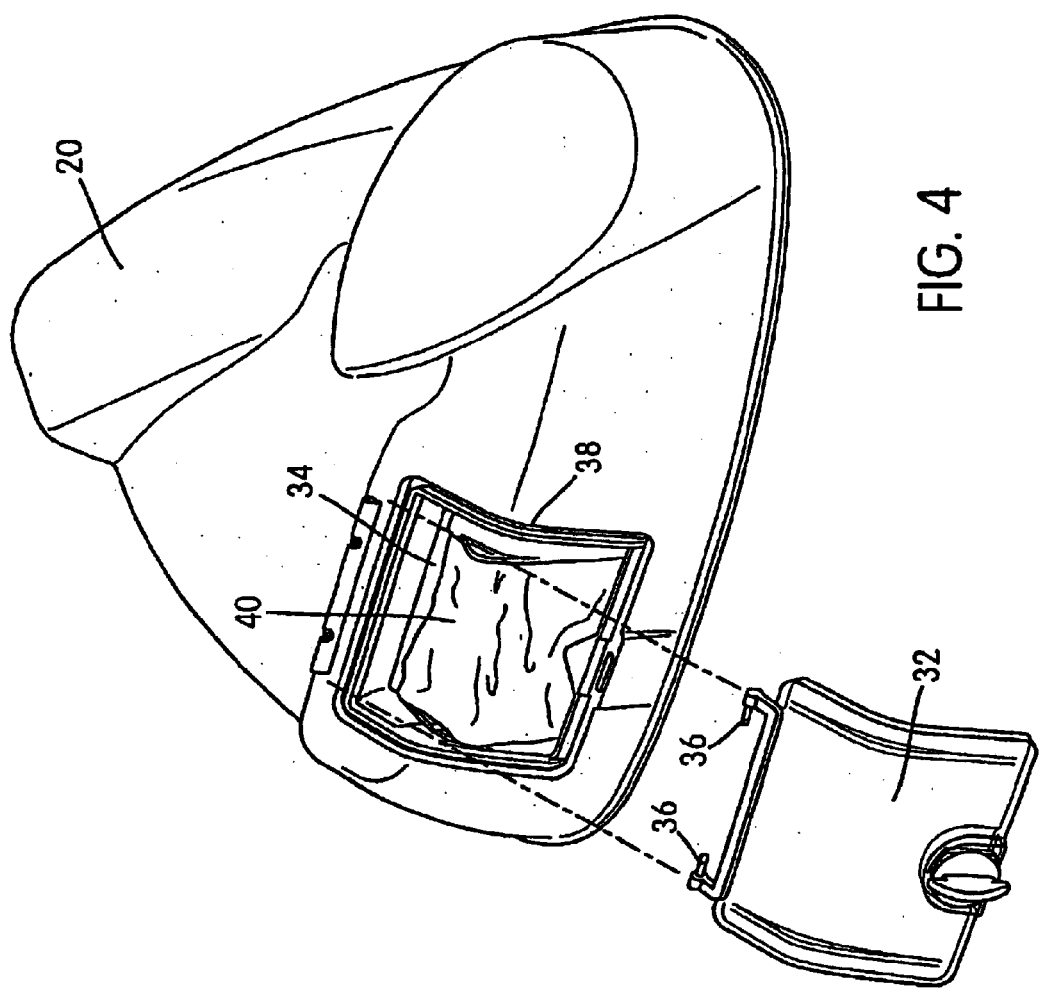
FIG. 4 is a perspective view of a top shell of the housing of the device of FIG. 2.

The upper shell 20 of the housing 16 includes an access door 32 that can be moved between open and closed positions to open and close an access opening 34 formed in the housing wall. The access door 32 and the access opening 34 opened and closed thereby is best illustrated in FIG. 4. The door 32 is pivotally mounted to the upper shell 20 to facilitate its opening and closing movements by inserting pivot pins 36 at the upper end thereof into openings (not shown) formed in the upper shell 20 adjacent the upper edge of the opening 34. In the broader aspects of the invention the door 32 may be entirely separable from the housing 16, or may be connected for opening and closing movements using any suitable construction. In fact, the provision of the door 32 is not necessary at all and is simply a feature for convenience. A deformable gasket 38 is attached along the periphery of the opening 34 to provide a seal between the door 32 and the periphery of the opening 34. The role of the access door 32 and its associated opening 34 is to enable a user to gain access to the interior of the housing 16.

As will be described in further detail below, a mesh bag 40, the interior of which defines an insect trap chamber, is removably mounted within the housing 16. The chamber defined by the bag 40 is communicated to the insect inlet 26 so that the insects drawn in by the vacuum will be deposited in the bag 40 whereat they will become dehydrated and perish. Alternatively, the material of the bag 40 may be treated with a poison for purposes of facilitating the insect termination function; however, that is not a necessary feature of the invention. The access door 32 and its associated opening 34 permit access into the interior of the housing 16 to allow the user to access the mesh bag 40 as desired for purposes of removal/replacement. Also, as another alternative, a plastic box or any other suitable structure may be used in place of mesh bag 40. In the disclosed embodiment, the door 32 is formed from a transparent material to enable to user to visually inspect the bag 40 to determine whether it needs removal/replacement. Specifically, the transparent material enables to user to visually verify whether the bag 40 is at or near its full capacity of insects. In the broader aspects of the invention, the door 32 need not be transparent, and further, as mentioned previously, the device does not necessarily require the door 32 and its associated opening 34.

Figure 5:
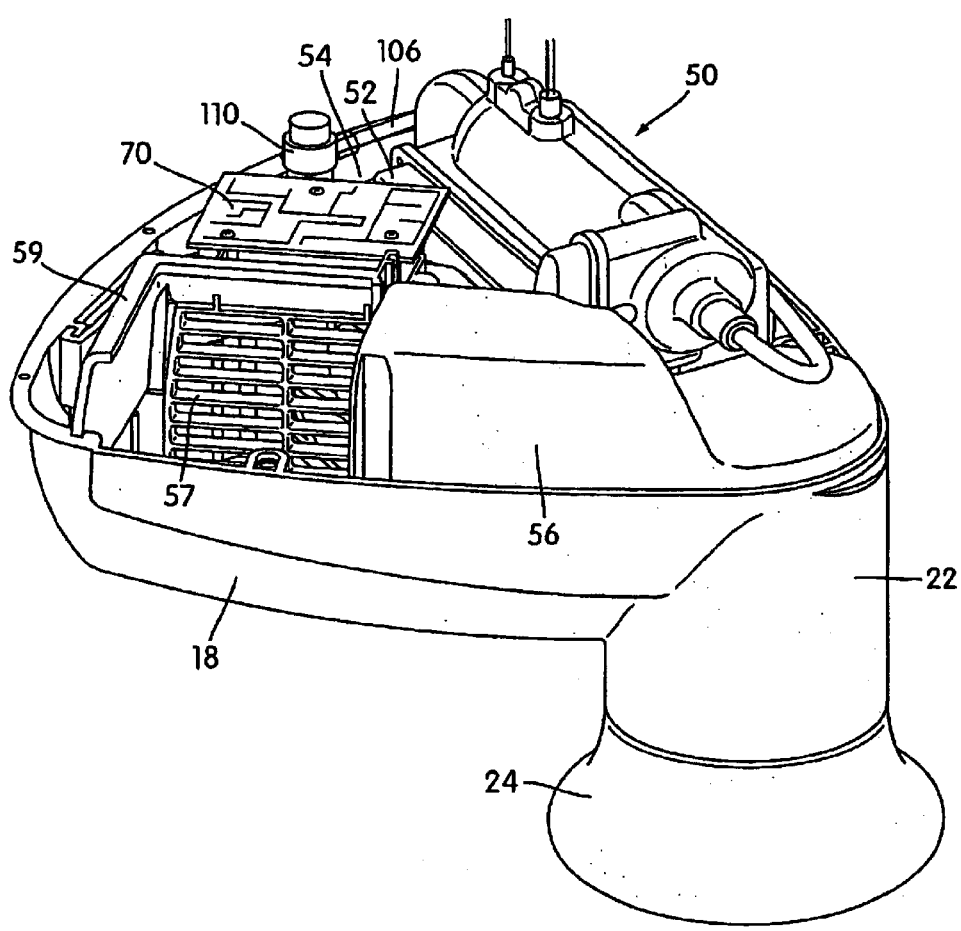
FIG. 5 is a perspective view of the housing of the device of FIG. 2 with the top shell removed.
Figure 6:
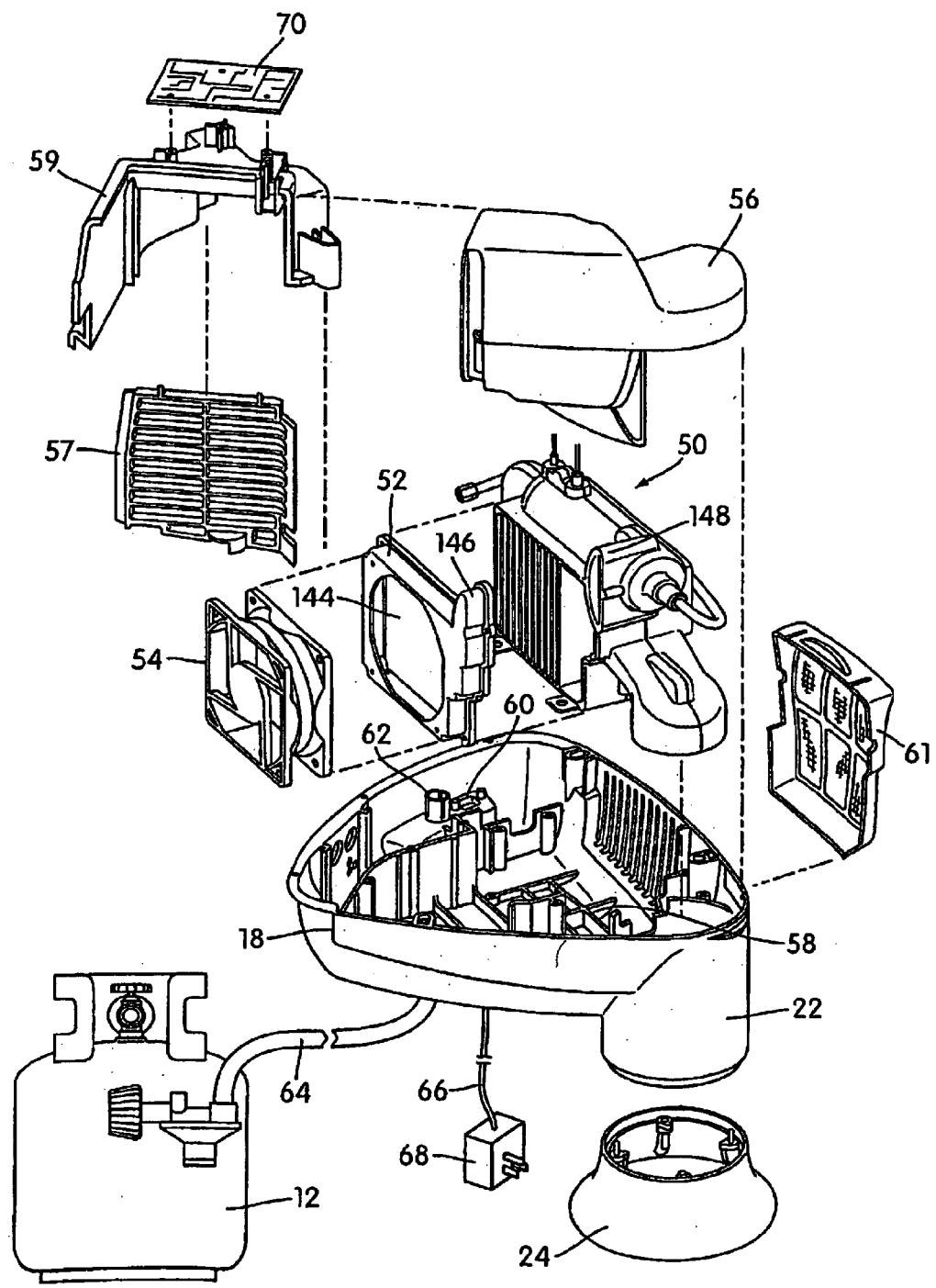
FIG. 6 is an exploded view of the components associated with the housing.

FIG. 5 shows a perspective view of the components internal to the housing 16, with the bag 40 and the upper shell 20 removed for clarity, and FIG. 6 shows an exploded view of these components. These internal components include a combustion/heat exchanger device, generally indicated at 50, a fan plenum 52, an electrically powered fan 54, and a partition structure 56. The bottom shell 18 includes a series of integrally molded ribs 58 defining a relatively flat are for mounting the combustion/heat exchanger device 50. Further, the bottom shell 18 also includes a pair of openings 60, 62. Opening 60 is provided for allowing a regulator hose 64 to be inserted therein and connected to the combustion/heat exchanger device 50 for purposes of supply combustible fuel, preferably propane, thereto. Opening 62 is provided for facilitating connection of the electrical power supply cord 66 (shown with a standard outlet plug 68 on the distal end thereof) to the controller 70, as shown in FIG. 6. The controller 70 is mounted on top of a partition structure 59. The partition structure also serves to support a grid barrier or baffle 57 which is provided to prevent the mesh bag 40 from contacting the fan 54. Additionally, a duct formed within the partition structure 56 is communicated between the mesh bag 40 and the intake nozzle 22 to provide a continuous flow path from the inlet 26 to the mesh bag 40. Further, a filter 61 is provided to ensure the air that is passed over the combustion/heat exchanger device 50 is exhausted out of the device 10. The filter is constructed of a metallic mesh fabric, however, more broadly, any suitable filtering method would be acceptable.

Figure 7:
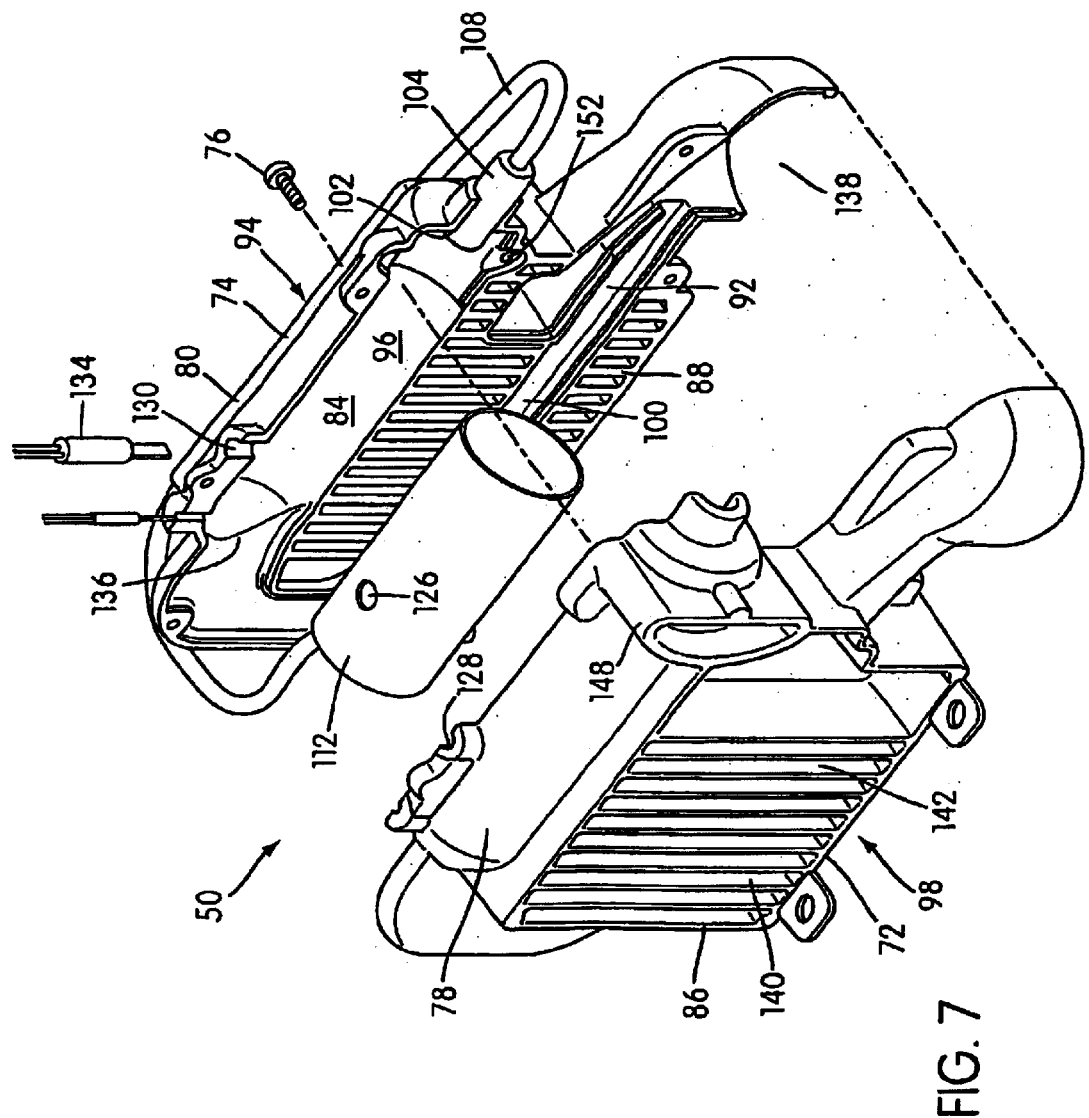
FIG. 7 is an exploded view of a combustion/heat exchanger device used in the device of FIG. 2.
Figure 8:
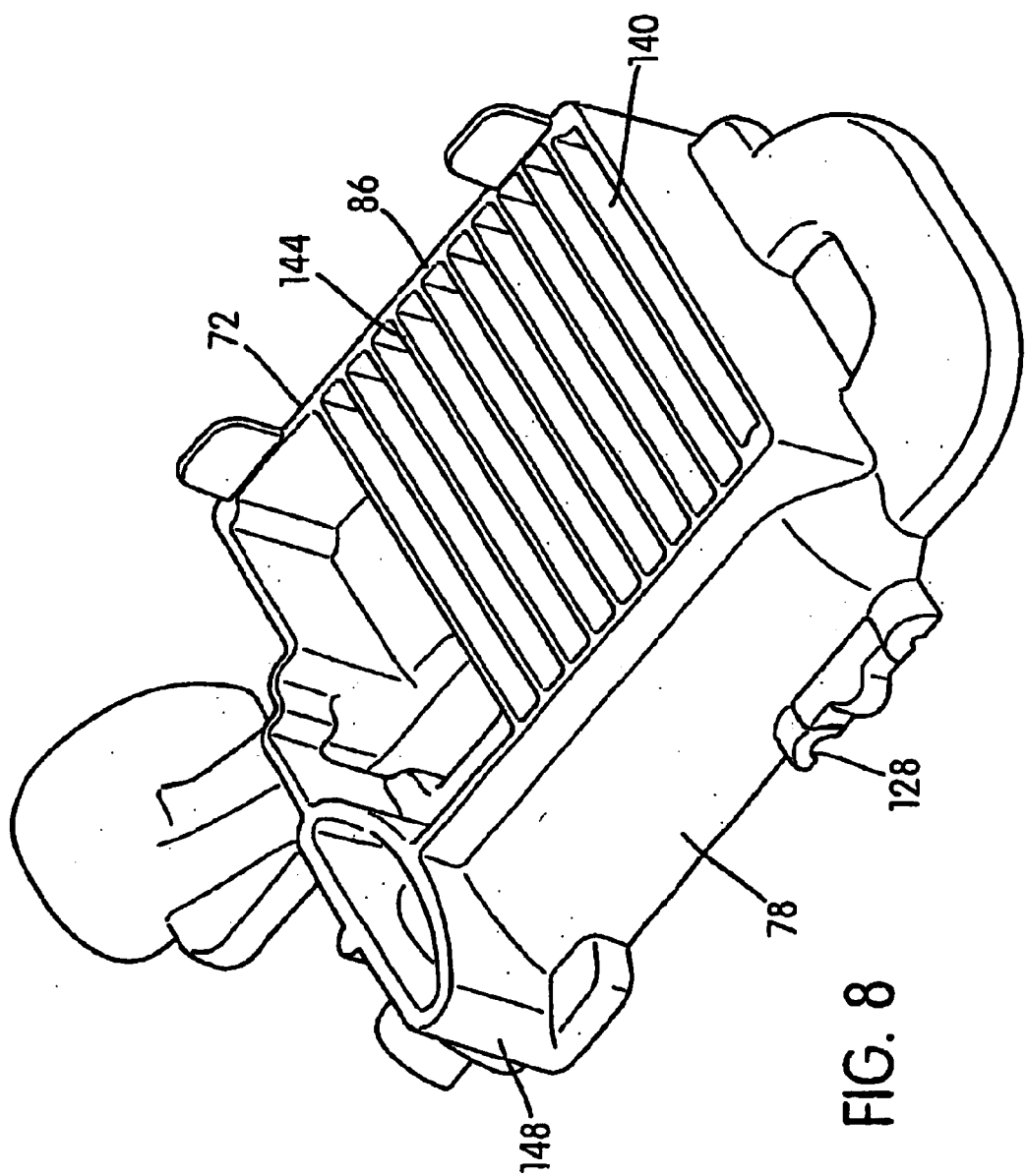
FIG. 8 is a perspective view of a right half of the combustion/heat exchanger device of FIG. 7 taken from the exterior thereof.

Referring now to FIG. 7, the combustion/heat exchanger device 50 comprises a pair of halves 72, 74 each formed from a heat conductive material, such as steel or any other metal. These halves 72, 74 are fastened together by a series of fasteners, such as the threaded cap screw 76. Alternatively, welding or other fastening arrangements may be used. In the illustrated embodiment, the halves 72, 74 are each cast from steel, but any suitable heat conductive material or method of forming may be used. Each half 72, 74 has a partial combustion chamber portion 78, 80 each defining a partial combustion chamber 82, 84 (see FIG. 9 for partial chamber 82), and a partial heat exchanger portion 86, 88 each defining a partial heat exchanging path 90, 92 (see FIG. 9 for partial path 92). During assembly, the two halves 72, 74 are coupled together such that such that (a) the partial combustion chamber portions 78, 80 are coupled to define a combustion chamber portion 94 of the device 50 and the partial combustion chambers 82, 84 are coupled to define a combustion chamber, generally indicated at 96, extending through the combustion chamber portion 94 and (b) the partial heat exchanger portions 86, 88 are coupled to define a heat exchanger portion 98 and the partial heat exchange paths 90, 92 are coupled to define a heat exchange path, generally indicated at 100, communicated to the combustion chamber 96.

The combustion chamber 96 has an inlet port 102. A fuel nozzle 104 is received in the inlet port 102. The nozzle 104 is of a conventional type and has a spray angle of approximately 45 degrees. The spray nozzle 104 is communicated to a solenoid manifold 106 (shown in FIG. 5) mounted on the rear portion of the combustion/heat exchanger device 50 by an elongated tube 108. The proximal end of the regulator 64 (shown in FIG. 6) connects to the solenoid manifold 106 and the manifold establishes fluid communication between the fuel supply (i.e. propane tank 12) and the nozzle 104, thereby providing for delivery of the combustible fuel to the nozzle 104 and hence the combustion chamber 96. A solenoid valve 110 moves between an open position for enabling the fuel to flow through the manifold 106 for delivery to the nozzle 104 and a closed position for preventing the fuel from flowing through the manifold 106, and thus preventing it from flowing to the nozzle 104. The solenoid valve 110 includes a spring (not shown) biasing the valve towards its closed position. The solenoid valve 110 is electrically communicated to the controller 70 and the controller 70 normally transmits electrical signals to energize the solenoid valve 110 and move it to its open position when the power cord 66 is plugged into an electrical power supply. Under certain operating conditions, as dictated by the control scheme that is discussed herein below, the controller 70 will interrupt the aforementioned electrical signal in order to cause the spring to move the valve 110 to its closed position for the purpose of preventing further fuel flow to the nozzle 104 and the combustion chamber 96.

The use of the solenoid valve 110 is a preferred feature and should not be considered limiting.

Referring now to FIGS. 11–15, the combustion chamber 96 has a tubular sleeve 112 mounted therein. A relatively thin diffuser plate 114 is mounted within the sleeve 112 at the end thereof that is adjacent the nozzle 104. The diffuser plate 114 has a plurality of apertures 116 punched therethrough, best seen in FIG. 14. The punching of these apertures 116 forms a series of flanges 114a extending outwardly from the downstream side (with respect to fuel flow) of the plate 114. An uncoated, catalytically inactive ceramic monolith 118 is positioned within the sleeve 112 downstream from the diffuser plate 114 in spaced apart relation therefrom. The ceramic monolith 118 has a series of elongated essentially linear conduits 120 formed through the length thereof. These conduits 120 are best seen on FIG. 13 and in the illustrated embodiment there are 400 of them, although any amount may be used. Finally, a catalyst element 122 is positioned within the sleeve 112 in spaced apart relation from the ceramic monolith 118. The catalyst element 122 includes a monolithic catalyst body 124 formed of ceramic and coated with a catalytically active material, such as platinum. The body 124 has a plurality of elongated essentially linear conduits formed through the length thereof in a fashion similar to monolith 118. The distribution of these conduits are similar to those on the ceramic monolith 118, except that in the illustrated embodiment there are 100 conduits in the catalyst body, although any number may be used.

The tubular wall of the sleeve 112 has an igniter receiving hole 126 formed therethrough and positioned between the catalyst body 124 and the ceramic monolith 118. During assembly, the sleeve 112, with the plate 114, monolith 118, and body 124 pre-assembled therein, is positioned in one of the partial combustion chambers 82, 84 prior to coupling the same together. Each of the partial combustion chamber portions 78, 80 has a partial igniter receiving hole 128, 130 formed on the upper edge thereof, which when coupled together define an igniter receiving hole. The igniter receiving hole 126 of the sleeve 112 is aligned with the igniter receiving hole defined by partial holes 128, 130 so that an igniter 134 can be inserted through the holes and positioned in between the body 124 and the monolith 118. The igniter 134 is powered by the electricity delivered from the controller 70 and creates a spark that ignites a fuel/air mixture flowing between the monolith 118 and the catalyst body 124. During operation, as the fuel/air mixture continues to flow to the catalyst body 124, the fuel/air mixture will be continuously combusted. This region is referred to as the combustion point. The combustion point is located downstream of the monolith 118 and the diffuser plate 114.

Broadly speaking, during operation, the catalyst body 124 is raised to a temperature that enables continuous combustion of the fuel/air mixture being delivered thereto. That is, at its operating temperature, the catalyst body 124 is hot enough to burn the fuel/air mixture thereto, which in turn continues to maintain the catalyst body 124 at an elevated temperature. During combustion, the catalytically active material helps to convert any carbon monoxide in the resulting exhaust gas to carbon dioxide. The combustion may occur within the catalyst 24 or may occur before the catalyst body 24.

Figure 15:
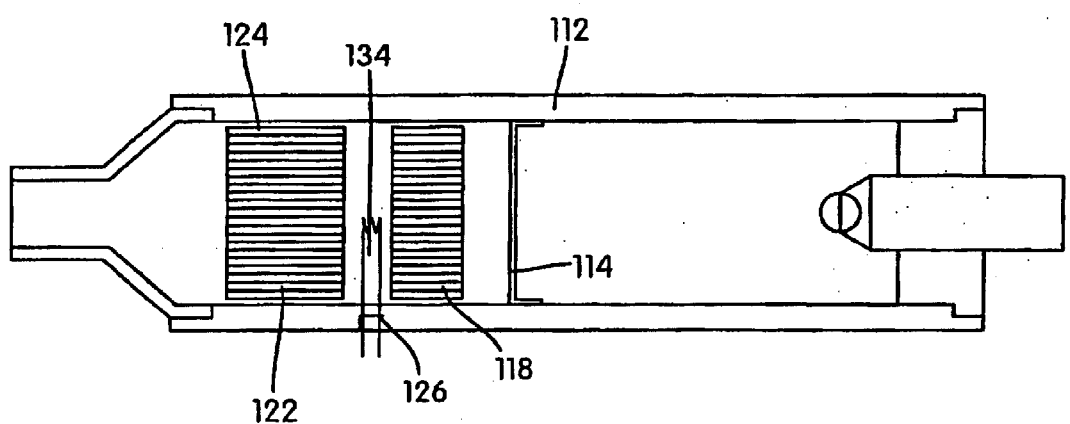
FIG. 15 schematically illustrates the layout of components within the combustion/heat exchanger device.

The combustion operation occurs as follows, with reference being made for best understanding to FIG. 15. The fuel (i.e., propane) is sprayed into the upstream end of the combustion chamber 96 and pressurized air is also forced into the upstream end of the chamber 96 for mixture with the fuel. The manner in which the air is supplied will be described below with reference to the function and operation of the fan 54 and the heat exchanger portion 98, because the pressurized air is derived from the fan 54. This creates a turbulent mixture of fuel and air. At this point, turbulence is desirable to ensure that the fuel and air mix together thoroughly. However, turbulence is undesirable at the combustion point. Thus, the diffuser plate 114 functions to initially reduce the turbulence and thus initially "straightens" the flow. Specifically, as the mixture flows downstream through the apertures 116 formed through the plate 114, the apertures, and particularly the flanges extending downstream therefrom, function to "align" the mixture flow in the downstream direction and reduce the turbulence thereof, thus making the flow somewhat more laminar. As the mixture continues to flow downstream, it enters the conduits 120 of the ceramic monolith 118. The elongated, essentially linear configuration of these conduits 120 eliminates essentially all the turbulence and provides an essentially laminar flow of fuel/air mixture to the combustion point. Because the fuel and air have been thoroughly mixed upstream while in a highly turbulent state, the mixture delivered by the monolith 118 to the combustion point is essentially homogeneous. A homogeneous and laminar mixture flow is desirable for ensuring that all the fuel is burned during combustion. Specifically, a homogeneous flow provides for even combustion of all the fuel and air present at the combustion point and laminar flow prevents "pockets" of unburned fuel from passing through with exhaust gas, as may happen if the mixture were highly turbulent during combustion. This is desirable to avoid the presence of fuel in the ultimate exhaust gas, as the presence of fuel is believed to be ineffective at attracting flying insects, and in fact may be a repellent.

The air fuel mixture is burned by combustion to create a heated exhaust gas. This exhaust gas includes, among other things, carbon dioxide and some carbon monoxide. As the exhaust gas flows through the catalyst body 124, the catalytically active material causes a reaction to occur whereby the carbon monoxide present in the gas is converted to carbon dioxide. A by-product of this reaction, commonly referred to as catalytic conversion, is also the creation of water (in vaporized form) in the exhaust gas. The manner in which this reaction occurs is well known and need not be described in further detail. The reason for providing this reaction is to eliminate, as much as possible, the presence of carbon monoxide in the exhaust gas, as it is known that carbon monoxide is a repellent to mosquitoes and other flying insects. The presence of water in the exhaust gas is an advantageous, although not necessary, result of the catalytic conversion reaction because the resulting exhaust gas will better mimic the exhalation of a mammal, which is typically moist due to presence of water. The use of a catalyst body 124 with a plurality of elongated conduits is advantageous in that it provides for increased exposure of the heated exhaust gas to the catalytically active material coated thereon.

Broadly speaking, the plate 114 and the monolith 118 can be said to constitute a turbulence reducing structure. The turbulence reducing structure having a plurality of apertures, constituted by the conduits 120 and the apertures 116 in the illustrated embodiment, oriented in the same general direction as the conduits of the catalyst body 124. As discussed above, these apertures are configured to straighten the flow of fuel from said inlet port to thereby reduce turbulence in said fuel prior to reaching the combustion point.

Preferably, an insulating material 130 is provided between both the monolith 118 and the catalyst body 124 and the interior surface of the sleeve 112.

The combustion chamber 96 has an exhaust port 136 downstream from the sleeve 112 that opens to the heat exchange path 100. The exhaust gas flows through the exchange path 100 to an exhaust outlet 138 of the combustion/heat exchange device 50. As the gas flows along this path 100, it transfers heat to the heat conductive material of the heat exchange portion 98. The heat exchanger portion 98 includes a plurality of vertically oriented heat exchanging fins 140 separated by a plurality of vertical openings 142. The heat transferred from the gas is conducted to these fins 140 and the fan 54 causes air to flow through the openings 142 as described below. The air flowing through these openings 142 cools the fins 140 and absorbs the heat transferred from the exhaust gas. Optimally, the temperature of the exhaust gas as it exits the exhaust port 138 should be around ambient temperature and preferably no greater than 115° F. Even more preferably, the exhaust gas temperature should be no greater than 5–15 degrees Fahrenheit greater than ambient. As a result, the end product of the process is an exhaust gas that is an excellent simulation of mammalian exhalation—it contains carbon dioxide, moisture from the presence of water, and has a temperature around or slightly above ambient, which is typical of mammalian exhalations. Further, the catalytic conversion reaction minimizes or eliminates the presence of carbon monoxide. Thus, the resulting exhaust gas is a superior attractant for mosquitoes and other flying insects that prey on the flesh or blood of mammals and that "home in on" mammalian exhalations to locate their prey.

The function and operation of the fan 54 will now be described. The fan 54 is powered by an electrical signal delivered by the controller 70, which as mentioned above is powered by electrical power delivered by cord 66. The use of a power cord 66 for connection to an external power source is not a necessary feature of the invention and the power for driving the fan 54 and any other components may be derived from other sources, such as batteries, solar panels, or the conversion of thermal energy from the combustion process into electrical energy, as is disclosed in the above-incorporated '243 patent.

The fan plenum 52 mounts to the combustion/heat exchanger device 50 by a series of fasteners or other suitable attachment means, such as an adhesive or snap fit features. The plenum 52 basically encloses one side of the device 50 and provides a mounting point for attachment of the fan 54.

A large circular opening 144, which is best shown in FIG. 6, in the plenum 52 allows the fan 54, which draws air from the insect intake port 26 through the duct 56 and the opening 34 for the mesh bag 40, to cause air to flow from the fan 54 through the opening 144 and to the openings 142 of the combustion/heat exchanger device 150 and out the filter 61. Thus, the fan 54 functions to both cool the fins 140 and create the vacuum for drawing insects into the insect intake port 26. However, any device suitable for creating a vacuum may be used and the provision of a single fan 54 is just one example of a suitable vacuum device. Further, in the broadest aspects of the invention, the same device need not be used to both create the vacuum and supply air to the combustion chamber.

Figure 9:
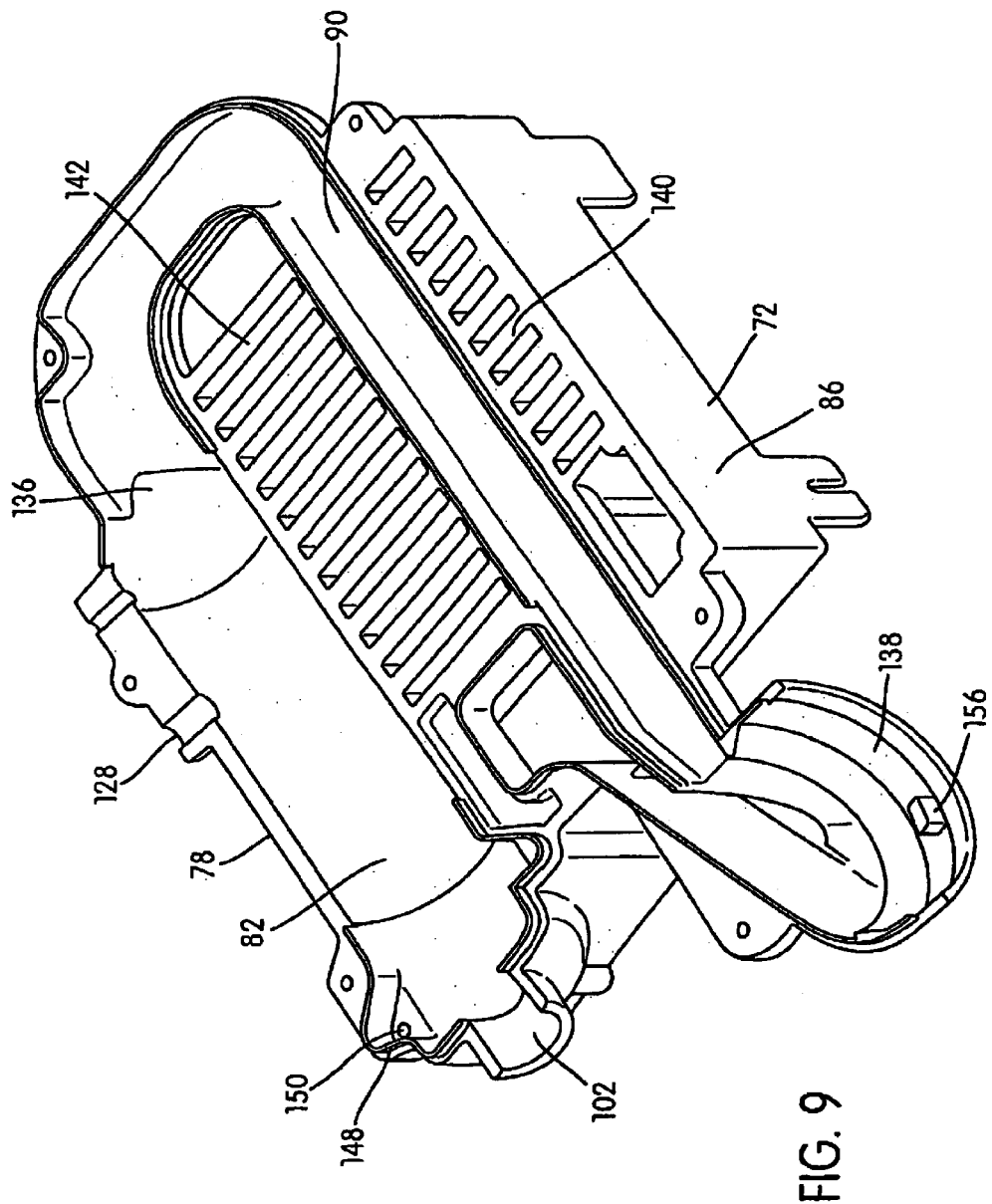
FIG. 9 is a perspective view of a right half of the combustion/heat exchanger device of FIG. 7 taken from the interior thereof.
Figure 10:
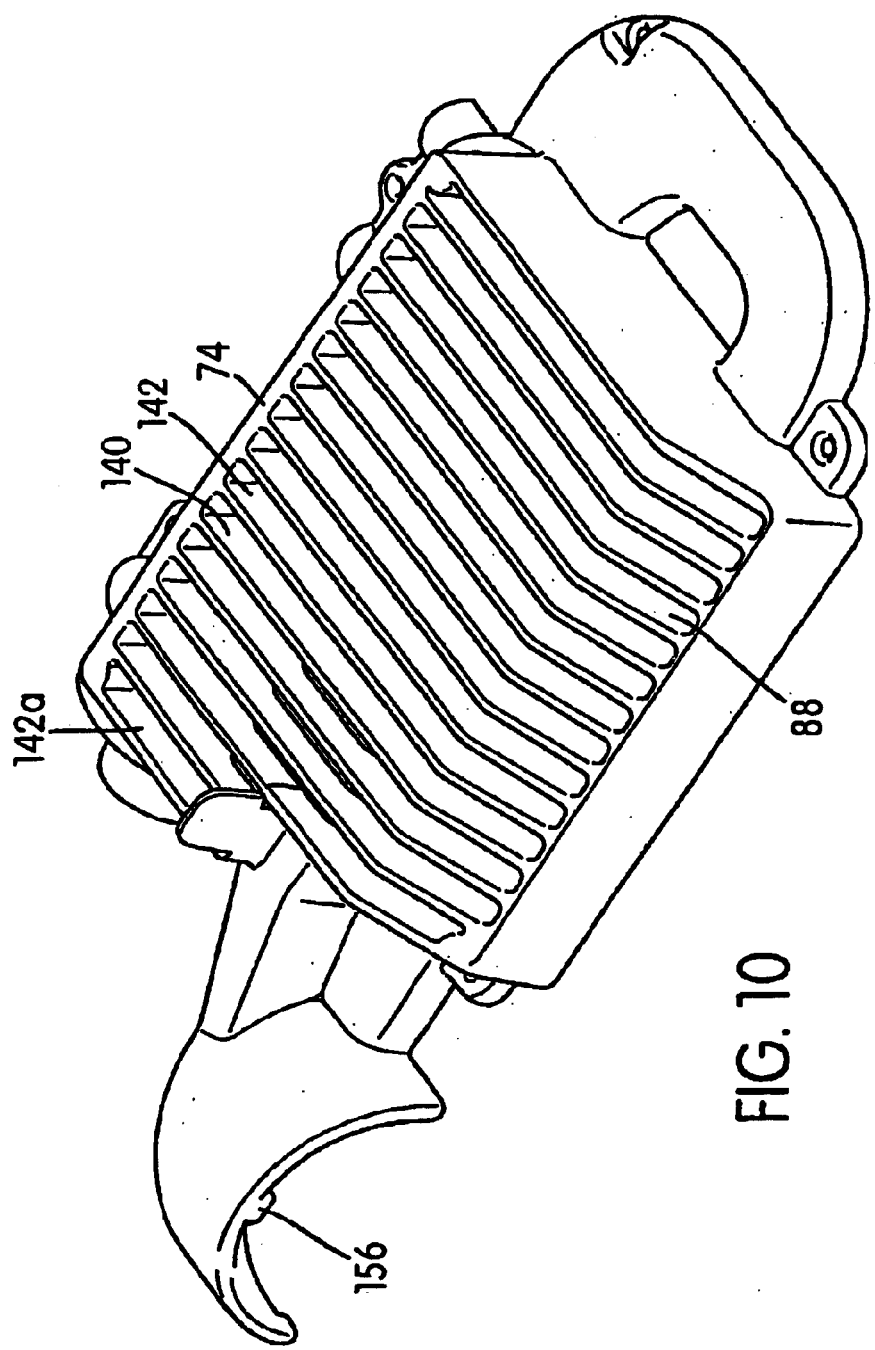
FIG. 10 is a perspective view of the left half of the combustion/heat exchanger device of FIG. 7 taken from the exterior thereof.
Figure 11:
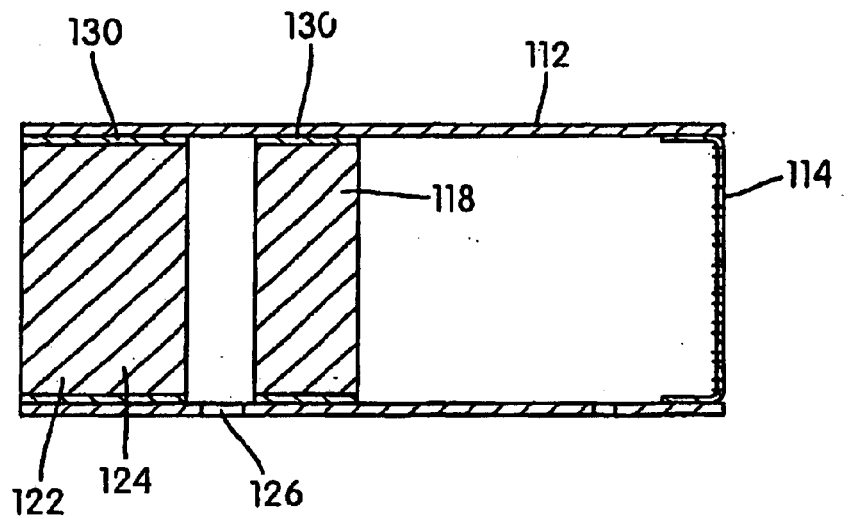
FIG. 11 is a cross-sectional view taken along line A—A of FIG. 12.
Figure 12:
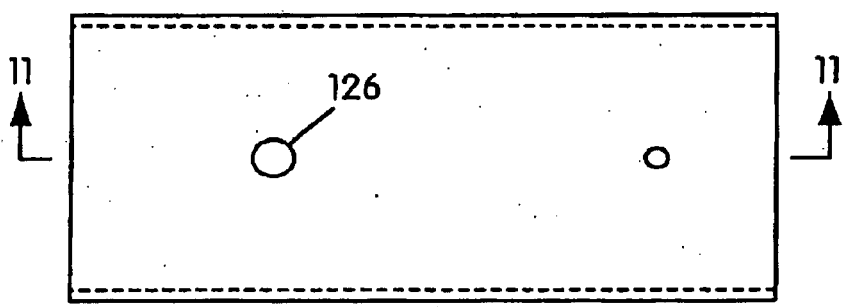
FIG. 12 is a top view of the sleeve used in the combustion/heat exchanger device of FIG. 7.
Figure 13:
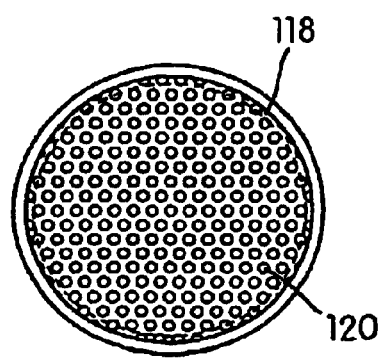
FIG. 13 is a cross-sectional view taken along line B—B of FIG. 11.

On the forward portion of the plenum 52 is an air supply portion 146 that couples over a corresponding air supply portion 148 on the combustion/heat exchanger device 50, also shown in FIG. 6. As can be seen in FIG. 9, portion 148 has an upper opening 150 that communicates with the upper portion of the combustion chamber 96. Also, as can be seen in FIG. 7, portion 148 has a lower opening 152 that communicates with the lower portion of the combustion chamber 96. Opening 152 opens to the downstream side (relative to the airflow drawn by the fan 54) of the device 50 through opening 142a (shown in FIG. 10) and thus is communicated with the filter 61. Opening 150 opens to the upstream side of the device 50 through the air supply portion 148 thereof and thus communicates with the fan plenum 52 and the fan 54. As a result of this construction, the fan 54 enables ambient air to be delivered to the combustion chamber 96 by forcing ambient air through the chamber 96 via openings 150 and 152. At that juncture, the air forced in as such mixes with the fuel delivered by nozzle 104 for combustion according to the process described above.

Figure 16:
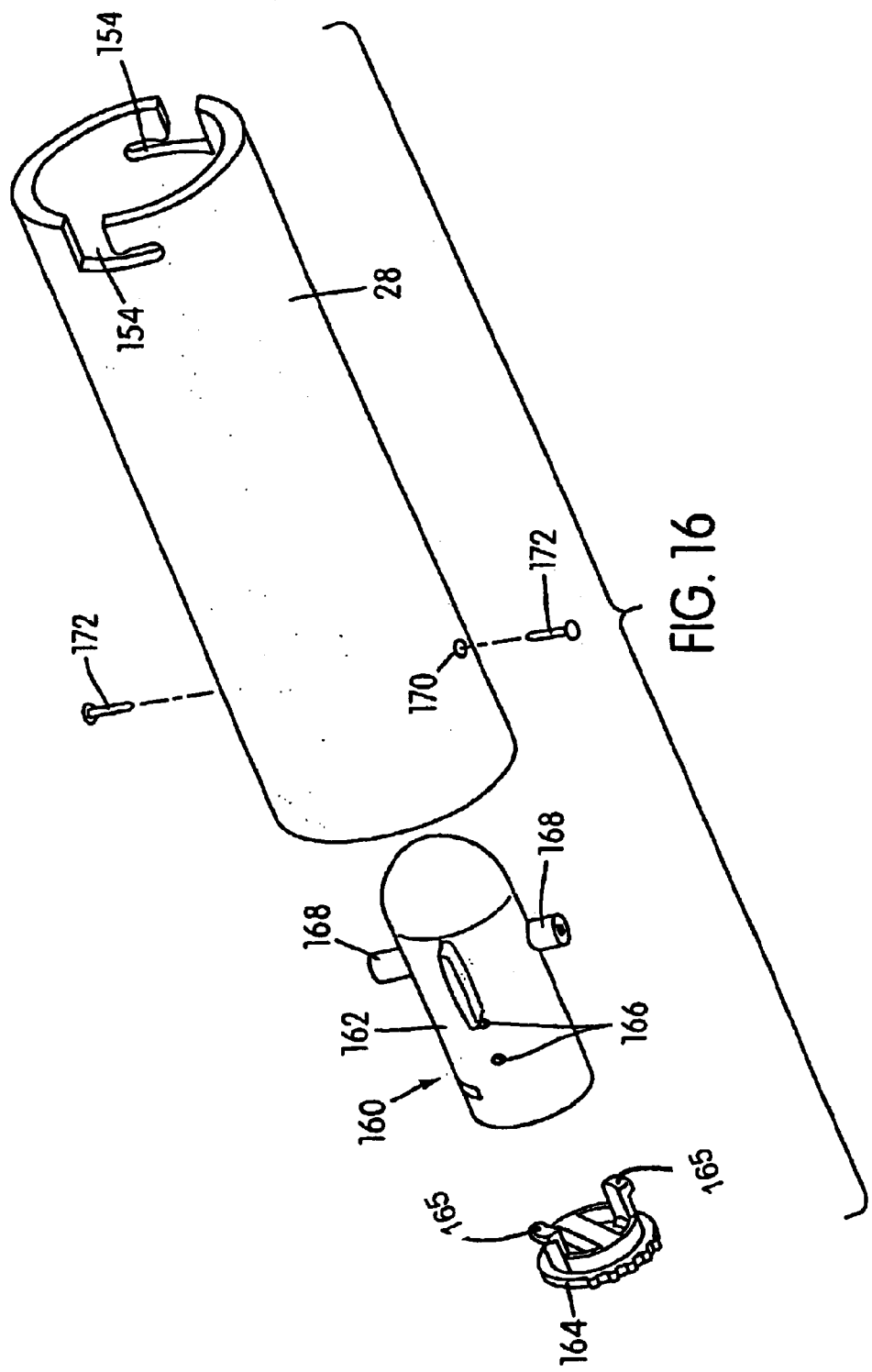
FIG. 16 is an exploded view of an outlet nozzle of the device of FIG. 2 and the components associated therewith.

FIG. 16 illustrates the outlet nozzle 28, which in the illustrated construction is removable, although removability is not a necessary feature. The upper end of the nozzle 28 has a pair of lug receiving slots 154 that are each essentially L-shaped. These lug receiving slots 154 enable the nozzle 28 to be mounted to the lugs 156 provided on the internal periphery of the exhaust outlet port 138 for the combustion/heat exchanger device 50. These lugs 156 can be best seen in FIGS. 9 and 10. The nozzle 28 is mounted by aligning the open ends of the slots 154 with the lugs 156, moving the nozzle 28 axially upwardly until the lugs 156 reach the bottom of the slots 154, and the rotating the nozzle 28 in a clockwise direction.

A supplemental insect attractant element 160 is mounted in the lower end of the nozzle 28. The insect attractant element 160 includes a housing 162 and a cap 164 for closing the open bottom end of the housing 160. The cap 164 has snap-in elements 165 for releasably securing it within the housing 22. The attractant used inside the housing may be octenol or any other material that mimics a mammalian smell that will assist in attracting mosquitoes and other flying insects. The housing 162 has a plurality of openings 166 for enabling the attractant to mix with the exhaust gas and become part of the exhaust flow. The housing 162 has a pair of internally threaded portions 168 that align with openings 170 on the nozzle 22. A pair of screws 172 are inserted into these openings and into the threaded portions 168 to releasably attach the housing 162. When the user desires, the attractant can be removed and replaced as needed by removing the nozzle 28 and opening the cap 164 to access the housing interior.

Figure 17:
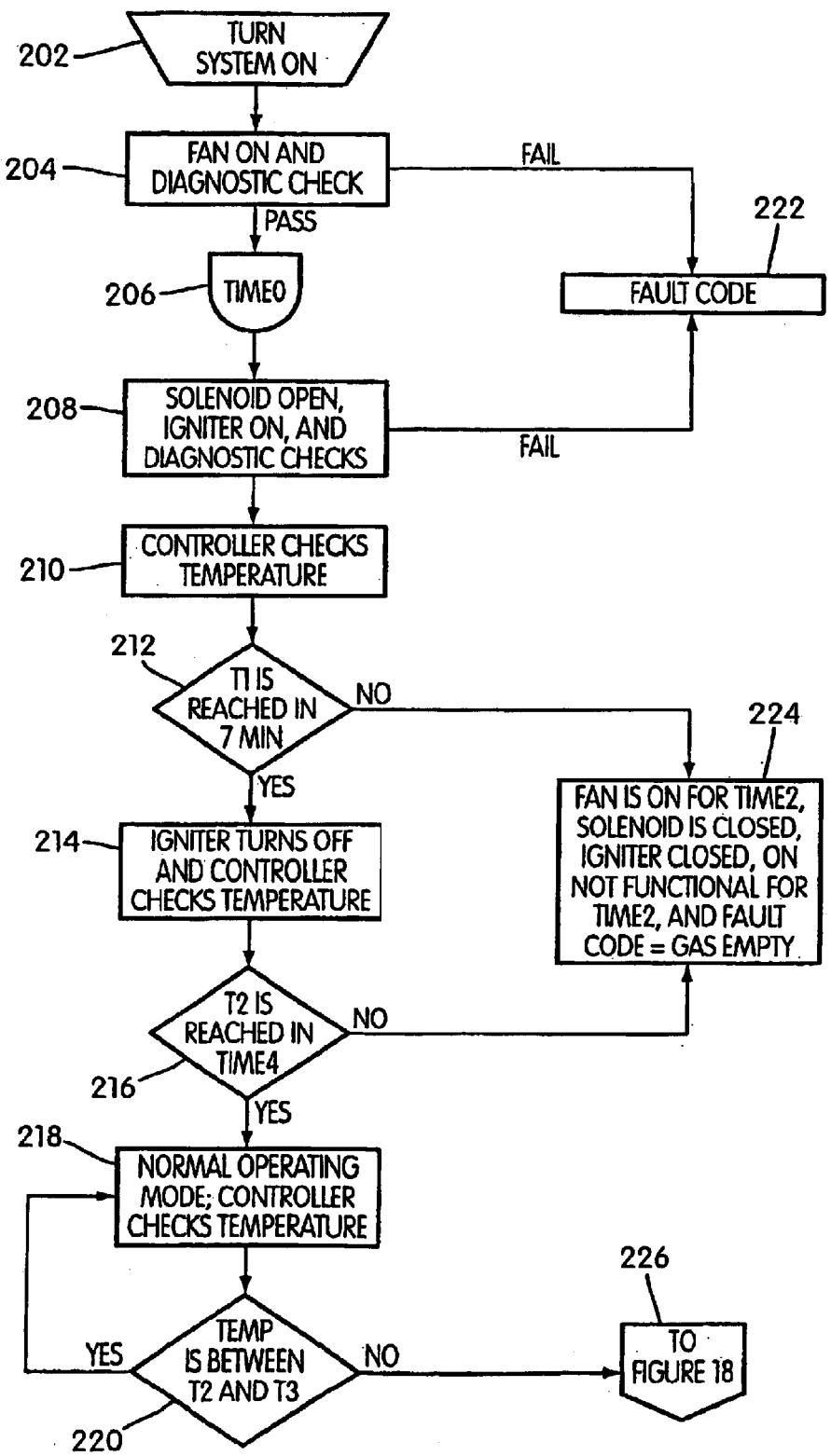
FIGS. 17–19 are an exemplary flow chart of a controller in accordance with the principles of the present invention.
Figure 18:
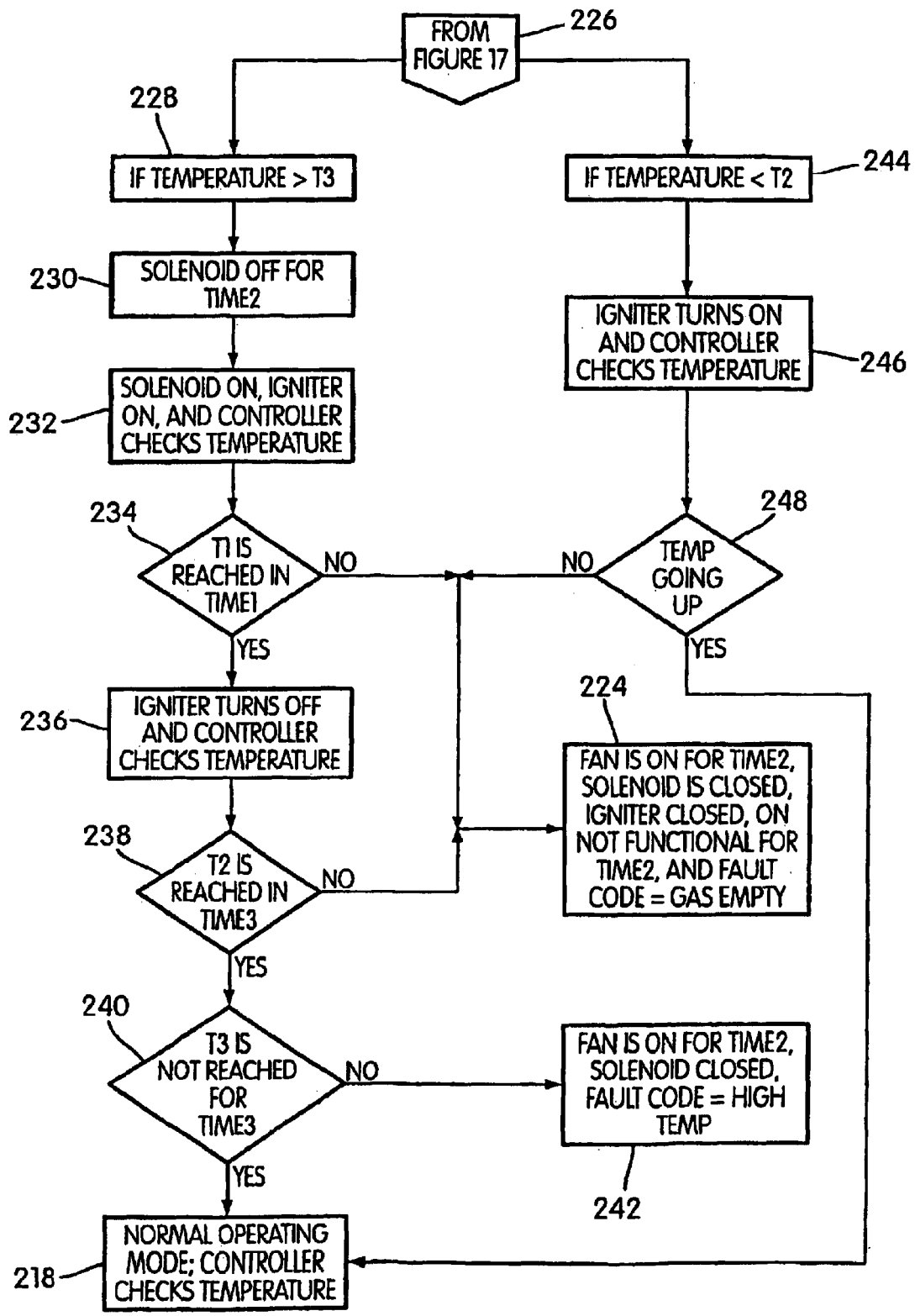
Figure 19:
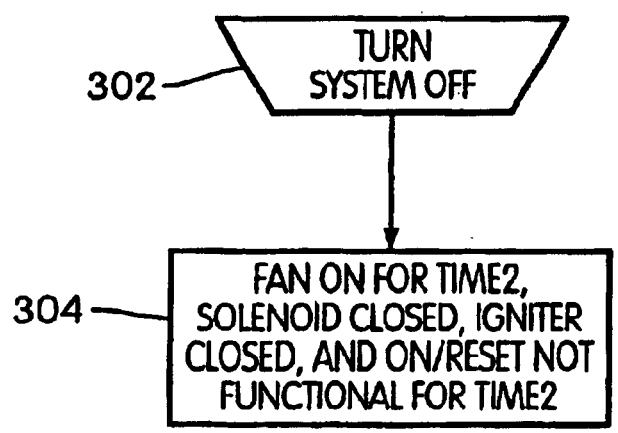

Referring now to FIGS. 17–19, the controller 70 is described with reference to the exemplary flow charts in accordance with the principles of the present invention. When the flying insect trapping device 10 is turned on, as shown by 202, the controller 70 turns on the fan 54 and performs a diagnostic check on the fan at 204. If the diagnostic check of the fan fails or the fan 54 fails to turn on, the controller 70 will stop the system 10 and provide an indication to the user that there was an error with the fan 54. Once the fan 54 is on and the diagnostic tests for the fan have been passed, the controller 70 waits for time0 as indicated by 206 and opens the solenoid 110, turns on the igniter 134 and performs a diagnostic test of the rest of the system at 208. The diagnostic test of the rest of the system includes, for example, testing the igniter, the thermister, the solenoid, the bug bag switch, etc. Again, if the diagnostic test at 208 fails, the controller will provide an indication to the user as to which test failed, as indicated by 222.

Next the controller 70 checks the temperature of the system at 210 and as indicated at 212 if a temperature T1 is reached within 7 minutes the process continues. However, if the temperature T1 is not reached within 7 minutes, the process continues to 224 where the fan 54 remains on for time 2, the solenoid 110 is closed, the igniter 134 is closed, the system on function is disabled for time 2, and the controller 70 indicates to the user that there is no gas in the tank. If the temperature check at 212 is passed then the igniter is turned off at 214 and at 216, the temperature of the system is checked again. If a temperature T2 is reached within time 4 the process continues to 218 where the controller operates in a normal mode and periodically checks the temperature, otherwise the controller goes to the operation described above at 224 where it indicates to the user that there is no gas in the tank 12.

Under the normal operating mode 218, the controller makes sure that the temperature is between T2 and T3. If it is, the system continues to operate normally. Otherwise, the system 10 enters a temperature maintenance process as described with reference to FIG. 18.

FIG. 18 shows two possible situations that may occur if the temperature of the system is not between T2 and T3. The first case 228, is that the temperature of the system has increased above T3. In this situation, the controller 70 will turn off the solenoid for time2 as indicated by 230. Next, as indicated by 232, the solenoid 110 is turned on, the igniter 134 is turned on, and the controller checks the system temperature. If the system temperature does not increase to T1 within time1 (as indicated by 234), the controller will indicate to the user that the gas tank is empty, as previously described with respect to 224. If the temperature does increase to T1, the igniter 134 is turned off and the controller 70 checks the temperature, as indicated by 236. Again, if the temperature of the system does not reach T2 within time 3, as indicated by 238, operation 224 of indicating that the gas tank 12 is empty will occur. If the temperature T2 is reached in time, the controller will make ensure that temperature T3 is not reached for time 4 (shown as 240) and return the system to normal operating mode 218. However, if the temperature does increase above T3 within T4, the fan will remain on for time 2, the solenoid 110 will be closed, and the controller will notify the user that the temperature is too high.

The second case, 244, is when the temperature of the system 10 is below T2. In this case, the igniter 134 turns on and the controller 70 checks the temperature of the system 10, as indicated by 246. At 248, if the temperature of the system is increasing, the controller 70 returns the system to the normal operating mode 218. Otherwise, the controller 70 indicates to the user, as previously described, that the gas tank 12 is empty.

FIG. 19, illustrates an exemplary control for turning the system 10 off. When the system 10 is turned off, as indicated by 302, the controller 70 will leave the fan 54 on for time 2, close the solenoid 110, close the igniter 134 and disable the on function for time 2, as indicated by 304.

The temperatures described above are, in the above exemplary embodiment, 600, 800, and 1000 degrees Fahrenheit for T1, T2, and T3 respectively. With regard to the times, time 0, time 1, time 2, time 3, and time 4 are 3, 2, 5, 4, and 5 minutes respectively. The temperatures and times given above are only exemplary and the present invention should not be limited to these values. In fact, any value can be chosen for these times and temperatures.

Broadly speaking, the controller can perform a variety of functions and the functions described above are intended to be one example of several contemplated methods of operation for the controller 70. In general, the controller 70 should operate the system 10 and the operation need not contain each of the steps shown in FIGS. 17–19 or described above.

The foregoing illustrated embodiment has been provided to illustrate the functional and structural principles of the present invention and is not intended to be limiting. To the contrary, the present invention is intended to encompass all alterations, additions, substitutions and equivalents within the spirit and scope of the following appended claims.

What is claimed is:

1. A flying insect trapping device configured to be used with a fuel supply containing combustible fuel, comprising:

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body having a predetermined configuration with a plurality of essentially linear elongated conduits extending between upstream and downstream end portions of the body, the elongated conduits enabling the exhaust gas created in said combustion chamber to flow therethrough from the upstream end portion to the downstream end portion towards said exhaust port, said catalyst body including a catalytically active material that, during operation, converts carbon monoxide in said exhaust gas to carbon dioxide as said exhaust gas flows through said elongated conduits;

an exhaust outlet carried on said frame, said exhaust outlet being communicated with the exhaust port of said combustion device and being configured to allow said exhaust gas to flow outwardly through said exhaust outlet so that insects attracted to the carbon dioxide in said exhaust gas will fly towards said exhaust outlet;

an insect inlet communicated with said insect trap chamber to enable flying insects to enter said trap chamber through said insect inlet; and a vacuum device communicated to said insect inlet, said vacuum device being constructed and arranged to draw insects attracted to said exhaust outlet through said insect inlet and into said insect trap chamber.

2. A flying insect trapping device according to claim 1, wherein said combustion device further comprises turbulence reducing structure disposed within said combustion chamber upstream of laid catalyst element, said turbulence reducing structure having a plurality of apertures oriented in the same general direction as the conduits of said catalyst body, said apertures being configured to straighten the flow of fuel from said inlet port to thereby reduce turbulence on said fuel.

3. A flying insect trapping device according to claim 2, wherein said turbulence reducing structure comprises a catalytically inactive body and wherein said apertures comprise a plurality of essentially linear elongated conduits formed therethrough for straightening the flow of said fuel from said inlet port.

4. A flying insect trapping device according to claim 3, wherein said turbulence reducing structure further comprises a relatively thin diffuser positioned within said combustion chamber between said inlet port and said catalytically inactive body, said apertures further comprising a plurality of holes formed through said diffuser, said holes being configured to initially straighten the flow of said fuel from said inlet port.

5. A flying insect trapping device according to claim 4, wherein said diffuser has annular flanges adjacent each aperture and extending towards said catalytically inactive body.

6. A flying insect trapping device according to claim 3, wherein said catalytically inactive body is a ceramic monolith.

7. A flying insect trapping device according to claim 1, wherein said catalytically active material is provided by platinum coated on said catalyst body.

8. A flying insect trapping device according to claim 2, further comprising a sleeve, said catalyst element and said turbulence reducing structure being received in said sleeve.

9. A flying insect trapping device according to claim 8, wherein said sleeve is lined internally with insulating material.

10. A flying insect trapping device according to claim 9, wherein said sleeve is metal.

11. A flying insect trapping device according to claim 4, further comprising a sleeve, said catalyst element, said catalytically inactive body and said relatively thin diffuser plate being received in said sleeve.

12. A flying insect trapping device according to claim 11, wherein said sleeve is lined internally with insulating material.

13. A flying insect trapping device according to claim 12, wherein said sleeve is metal.

14. A flying insect trapping device according to claim 1, further comprising a heat exchanger for reducing a temperature of said exhaust gas to approximately ambient temperature prior to reaching said exhaust outlet.

15. A flying insect trapping device according to claim 1, wherein said vacuum device is a single fan.

16. A flying insect trapping system, comprising:

a fuel supply containing combustible fuel;

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body having a predetermined configuration with a plurality of fixed essentially linear elongated conduits extending between upstream and downstream end portions of the body, the elongated conduits enabling the exhaust gas created in said combustion chamber to flow therethrough from the upstream end portion to the downstream end portion towards said exhaust port, said catalyst body including a catalytically active material that, during operation, converts carbon monoxide in said exhaust gas to carbon dioxide as said exhaust gas flows through said elongated conduits;

an exhaust outlet carried on said frame, said exhaust outlet being communicated with the exhaust port of said combustion device and being configured to allow said exhaust gas to flow outwardly through said exhaust outlet so that insects attracted to the carbon dioxide in said exhaust gas will fly towards said exhaust outlet;

an insect inlet communicated with said insect trap chamber to enable flying insects to enter said trap chamber through paid insect inlet; and a vacuum device communicated to said insect inlet, said vacuum device being constructed and arranged to draw insects attracted to said exhaust outlet through said insect inlet and into said insect trap chamber.

17. A flying insect trapping system according to claim 16, wherein said combustion device further comprises turbulence reducing structure disposed within said combustion chamber upstream of said catalyst element, said turbulence reducing structure having a plurality of apertures oriented in the same general direction as the conduits of said catalyst body, said apertures being configured to straighten the flow of fuel from said inlet port to thereby reduce turbulence in said fuel.

18. A flying insect trapping system according to claim 17, wherein said turbulence reducing structure comprises a catalytically inactive body and wherein said apertures comprise a plurality of generally linear elongated conduits formed therethrough for straightening the flow of said fuel from said inlet port.

19. A flying insect trapping system according to claim 18, wherein said turbulence reducing structure further comprises a relatively thin diffuser positioned within said combustion chamber between said inlet port and said catalytically inactive body, said apertures further comprising a plurality of holes formed through said diffuser, said holes being configured to initially straighten the flow of said fuel from said inlet port.

20. A flying insect trapping system according to claim 19, wherein said diffuser has annular flanges adjacent each aperture and extending towards said catalytically inactive body.

21. A flying insect trapping system according to claim 19, wherein said catalytically inactive body is a ceramic monolith.

22. A flying insect trapping system according to claim 16, wherein said catalytically active body is platinum-coated.

23. A flying insect trapping system according to claim 17, further comprising a sleeve, said catalyst element and said turbulence reducing structure being received in said sleeve.

24. A flying insect trapping system according to claim 23, wherein said sleeve is lined internally with insulating material.

25. A flying insect trapping system according to claim 24, wherein said sleeve is metal.

26. A flying insect trapping system according to claim 19, further comprising a sleeve, said catalyst element, said catalytically inactive body and said relatively thin diffuser plate being received said sleeve.

27. A flying insect trapping system according to claim 26, wherein said sleeve is lined internally with insulating material.

28. A flying insect trapping system according to claim 27, wherein said sleeve is metal.

29. A flying insect trapping system according to claim 16, further comprising a heat exchanger for reducing a temperature of said exhaust gas to approximately ambient temperature prior to reaching said exhaust outlet.

30. A flying insect trapping system according to claim 16, wherein said combustible fuel is propane.

31. A flying insect trapping system according to claim 16, wherein said vacuum device is a single fan.

32. A flying insect trapping device configured to be used with a fuel supply containing combustible fuel, comprising:

a supporting frame;

an insect trap chamber carried on said supporting frame;

a combustion/heat exchanger device comprising a pair of halves each formed from a heat conducting material and each having a partial combustion chamber portion and a partial heat exchanger portion formed integrally together, said partial combustion chamber portions each having a partial combustion chamber formed therein and said partial heat exchanger portions each having a partial heat exchange path formed therein;

said pair of halves of said combustion/heat exchanger device being coupled together such that (a) said partial combustion chamber portions are coupled to define a combustion chamber portion of said device and said partial combustion chambers are coupled to define a combustion chamber extending through said combustion chamber portion and (b) said partial heat exchanger portions are coupled to define a heat exchanger portion and said partial heat exchange paths are coupled to define a heat exchange path extending through said heat exchanger portion, said combustion chamber having an inlet port for connection to the fuel supply to enable the fuel to flow onto said combustion chamber for continuous combustion to create an exhaust gas that includes carbon dioxide within said combustion chamber, said heat exchange path being communicated to said combustion chamber and having an exhaust port opposite said inlet port to enable the exhaust gas to flow through said heat exchange path to said exhaust port; and said heat exchange portion being constructed such that said exhaust gas flowing out from said combustion chamber flows along said heat exchange path to said exhaust port and a temperature of the exhaust gas is reduced as the gas flows along said heat exchange path via conduction through the heat conductive material of said halves of said combustion/heat exchanger device;

an exhaust outlet carried on said frame, said exhaust outlet being communicated with the exhaust port of said combustion/heat exchanger device and being configured to allow said exhaust gas to flow outwardly therefrom so that insects attracted to the carbon dioxide in said exhaust gas will fly towards said exhaust outlet;

an insect inlet communicated with said insect trap chamber to enable flying insects to enter said trap chamber through said insect inlet; and a vacuum device communicated to said insect inlet, said vacuum device being constructed and arranged to draw insects attracted to said exhaust outlet through said insect inlet and into said insect trap chamber.

33. A flying insect trapping device according to claim 32, wherein said combustion/heat exchanger device further comprises a catalyst element disposed within said combustion chamber, said catalyst element being formed from a catalytically active material that, during operation, converts carbon monoxide in said exhaust gas to carbon dioxide as said exhaust gas flows therethrough and into said heat exchange path.

34. A flying insect trapping device according to claim 32, wherein said heat exchanger portion has a plurality of opening communicating said vacuum device to said insect inlet to enable said vacuum device to draw air through said openings to cool said heat exchanger portion.

35. A flying insect trapping device according to claim 34, wherein said heat exchanger portion has a plurality of fins spaced apart by said openings, said fins being positioned adjacent to said heat exchange path to conduct heat away from said exhaust gas for transfer to the air drawn through said openings.

36. A flying insect trapping device according to claim 35, wherein said combustion chamber is communicated to the air being drawn by said fan from said insect inlet for providing air to be mixed with the fuel supplied to said combustion chamber.

37. A flying insect trapping device according to claim 32, wherein said heat conductive material is metal.

38. A flying insect trapping device according to claim 37, wherein said metal is steel.

39. A flying insect trapping device according to claim 32, wherein said vacuum device is a single fan.

40. A flying insect trapping device according to claim 32, wherein said heat exchanger portion and said heat exchange path thereof are configured to reduce the temperature of said exhaust gas to approximately ambient temperature.

41. A flying insect trapping system, comprising:

a fuel supply containing combustible fuel;

a supporting frame;

an insect trap chamber carried on said supporting frame;

a combustion/heat exchanger device comprising a pair of halves each formed from a heat conducting material and each having a partial combustion chamber portion and a partial heat exchanger portion formed integrally together, said partial combustion chamber portions each having a partial combustion chamber formed therein and said partial heat exchanger portions each having a partial heat exchange path formed therein;

said pair of halves of said combustion/heat exchanger device being coupled together such that (a) said partial combustion chamber portions are coupled to define a combustion chamber portion of said device and said partial combustion chambers are coupled to define a combustion chamber extending through said combustion chamber portion and (b) said partial heat exchanger portions are coupled to define a heat exchanger portion and said partial heat exchange paths are coupled to define a heat exchange path extending through said heat exchanger portion, said combustion chamber having an inlet port for connection to the fuel supply to enable the fuel to flow into said combustion chamber for continuous combustion to create an exhaust gas that includes carbon dioxide within said combustion chamber, said heat exchange path being communicated to said combustion chamber and having an exhaust port opposite said inlet port to enable the exhaust gas to flow through said heat exchange path to said exhaust port; and said heat exchange portion being constructed such that said exhaust gas flowing out from said combustion chamber flows along said heat exchange path to said exhaust port and a temperature of the exhaust gas is reduced as the gas flows along said heat exchange path via conduction through the heat conductive material of said halves of said combustion/heat exchanger device;

an exhaust outlet carried on said frame, said exhaust outlet being communicated with the exhaust port of said combustion/heat exchanger device and being configured to allow said exhaust gas to flow outwardly therefrom so that insects attracted to the carbon dioxide in said exhaust gas will fly towards said exhaust outlet;

an insect inlet communicated with said insect trap chamber to enable flying insects to enter said trap chamber through skid insect inlet; and a vacuum device communicated to said insect inlet, said vacuum device being constructed and arranged to draw insects attracted to said exhaust outlet through said insect inlet and into said insect trap chamber.

42. A flying insect trapping system according to claim 41, wherein said combustion/heat exchanger device further comprises a catalyst element disposed within said combustion chamber, said catalyst element being formed from a catalytically active material that, during operation, converts carbon monoxide in said exhaust gas to carbon dioxide as said exhaust gas flows therethrough and into said heat exchange path.

43. A flying insect trapping system according to claim 41, wherein said heat exchanger portion has a plurality of opening communicating said vacuum device to said insect inlet to enable said vacuum device to draw air through said openings to cool said heat exchanger portion.

44. A flying insect trapping system according to claim 43, wherein said heat exchanger portion has plurality of fins spaced apart by said openings, said fins being positioned adjacent to said heat exchange path to conduct heat away from said exhaust gas for transfer to the air drawn through said openings.

45. A flying insect trapping system according to claim 44, wherein said combustion chamber is communicated to the air being drawn by said fan from said insect inlet for providing air to be mixed with the fuel supplied to said combustion chamber.

46. A flying insect trapping system according to claim 41, wherein said heat conductive material is metal.

47. A flying insect trapping system according to claim 46, wherein said metal is steel.

48. A flying insect trapping system according to claim 41, wherein said vacuum device is a single fan.

49. A flying insect trapping system according to claim 41, wherein said heat exchanger portion and said heat exchange path thereof are configured to reduce the temperature of said exhaust gas to approximately ambient temperature.

50. A flying insect trapping device configured to be used with a fuel supply containing combustible fuel, comprising:

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body with a plurality of essentially linear elongated conduits for enabling the exhaust gas created in said combustion chamber to flow therethrough towards said exhaust port, said catalyst body including a catalytically active material that, during operation, converts carbon monoxide in said exhaust gas to carbon dioxide as said exhaust gas flows through said elongated conduits;

an exhaust outlet carried on said frame, said exhaust outlet being communicated with the exhaust port of said combustion device and being configured to allow said exhaust gas to flow outwardly through said exhaust outlet so that insects attracted to the carbon dioxide in said exhaust gas will fly towards said exhaust outlet;

an insect inlet communicated with said insect trap chamber to enable flying insects to enter said trap chamber through said insect inlet; and a vacuum device communicated to said insect inlet, said vacuum device being constructed and arranged to draw insects attracted to said exhaust outlet through said insect inlet and into said insect trap chamber;

wherein said combustion device further comprises turbulence reducing structure disposed within said combustion chamber upstream of said catalyst element, said turbulence reducing structure having a plurality of apertures oriented in the same general direction as the conduits of said catalyst body, said apertures being configured to straighten the flow of fuel from said inlet port to thereby reduce turbulence in said fuel;

wherein said turbulence reducing structure comprises a catalytically inactive body and wherein said apertures comprise a plurality of essentially linear elongated conduits formed therethrough for straightening flow of said fuel from said inlet port;

wherein said turbulence reducing structure further comprises a relatively thin diffuser positioned within said combustion chamber between said inlet port and said catalytically inactive body, said apertures further comprising a plurality of holes formed through said diffuser, said holes being configured to initially straighten the flow of said fuel from said inlet port.

51. A flying insect trapping device according to claim 50, wherein said diffuser has annular flanges adjacent each aperture and extending towards said catalytically inactive body.

52. A flying insect trapping device configured to be used with a fuel supply containing combustible fuel, comprising:

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body with a plurality of essentially linear elongated conduits for enabling the exhaust gas created in said combustion chamber to flow therethrough towards said exhaust port, said catalyst body including a catalytically active material that, during operation, converts carbon monoxide in said exhaust gas to carbon dioxide as said exhaust gas flows through said elongated conduits;

an exhaust outlet carried said frame, said exhaust outlet being communicated with the exhaust port of said combustion device and being configured to allow said exhaust gas to flow outwardly through said exhaust outlet so that insects attracted to the carbon dioxide in said exhaust gas will fly towards laid exhaust outlet;

an insect inlet communicated with said insect trap chamber to enable flying insects to enter said trap chamber through skid insect inlet; and a vacuum device communicated to said insect inlet, said vacuum device being constructed and arranged to draw insects attracted to said exhaust outlet through said insect inlet and into said insect trap chamber;

wherein said combustion device further comprises turbulence reducing structure disposed within said combustion chamber upstream of said catalyst element, said turbulence reducing structure having a plurality of apertures oriented in the same general direction as the conduits of said catalyst body, said apertures being configured to straighten the flow of fuel from said inlet port to thereby reduce turbulence in said fuel;

wherein said turbulence reducing structure comprises a catalytically inactive body and wherein said apertures comprise a plurality of essentially linear elongated conduits formed therethrough for straightening the flow of said fuel from said inlet port;

wherein said catalytically inactive body is a ceramic monolith.

53. A flying insect trapping device configured to be used with a fuel supply containing combustible fuel, comprising:

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body with a plurality of essentially linear elongated conduits for enabling the exhaust gas created in said combustion chamber to flow therethrough towards said exhaust port, said catalyst body including a catalytically active material that, during operation, converts carbon monoxide in said exhaust gas to carbon dioxide as said exhaust gas flows through said elongated conduits;

an exhaust outlet carried on said frame, said exhaust outlet being communicated with the exhaust port of said combustion device and being configured to allow said exhaust gas to flow outwardly through said exhaust outlet so that insects attracted to the carbon dioxide in said exhaust gas will fly towards said exhaust outlet;

an insect inlet communicated with said insect trap chamber to enable flying insects to enter said trap chamber through said insect inlet; and a vacuum device communicated to said insect inlet, said vacuum device being constructed and arranged to draw insects attracted to said exhaust outlet through said insect inlet and into said insect trap chamber;

wherein said combustion device further comprises turbulence reducing structure disposed within said combustion chamber upstream of said catalyst element, said turbulence reducing structure having a plurality of apertures oriented in the same general direction as the conduits of said catalyst body, said apertures being configured to straighten the flow of fuel from said inlet port to thereby reduce turbulence in said fuel;

a sleeve, said catalyst element and said turbulence reducing structure being received in said sleeve.

54. A flying insect trapping device according to claim 53, wherein said sleeve is lined internally with insulating material.

55. A flying insect trapping device according to claim 54, wherein said sleeve is metal.

56. A flying insect trapping device according to claim 50, further comprising a sleeve, said catalyst element, said catalytically inactive body and said relatively thin diffuser plate being received in said sleeve.

57. A flying insect trapping device according to claim 56, wherein said sleeve is lined internally with insulating material.

58. A flying insect trapping device according to claim 57, wherein said sleeve is metal.

59. A flying insect trapping system, comprising:

a fuel supply containing combustible fuel;

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body with a plurality of essentially linear elongated conduits for enabling the exhaust gas created in said combustion chamber to flow therethrough towards said exhaust port, said catalyst body including a catalytically active material that, luring operation, converts carbon monoxide in said exhaust gas to carbon dioxide as said exhaust gas flows through said elongated conduits;

an exhaust outlet carried on said frame, said exhaust outlet being communicated with the exhaust port of said combustion device and being configured to allow said exhaust gas to flow outwardly through said exhaust outlet so that insects attracted to the carbon dioxide in said exhaust gas will fly towards said exhaust outlet;

an insect inlet communicated with said insect trap chamber to enable flying insects to enter said trap chamber through said insect inlet; and a vacuum device communicated to said insect inlet, said vacuum device being constructed and arranged to draw insects attracted to said exhaust outlet through said insect inlet and into said insect trap chamber;

wherein said combustion device further comprises turbulence reducing structure disposed within said combustion chamber upstream of said catalyst element, said turbulence reducing structure having a plurality of apertures oriented in the same general direction as the conduits of said catalyst body, said apertures being configured to straighten the flow of fuel from said inlet port to thereby reduce turbulence in said fuel;

wherein said turbulence reducing structure comprises a catalytically inactive body and wherein said apertures comprise plurality of generally linear elongated conduits formed therethrough for straightening the flow of said fuel from said inlet port;

wherein said turbulence reducing structure further comprises a relatively thin diffuser positioned within said combustion chamber between said inlet port and said catalytically inactive body, said apertures further comprising a plurality of holes formed through said diffuser, said holes being configured to initially straighten the flow of said fuel from said inlet port.

60. A flying insect trapping system according to claim 59, wherein said diffuser has annular flanges adjacent each aperture and extending towards said catalytically inactive body.

61. A flying insect trapping system according to claim 59, wherein said catalytically inactive body is a ceramic monolith.

62. A flying insect trapping system, comprising:

a fuel supply containing combustible fuel;

a supporting frame;

an insect trap chamber carried on said supporting frame;

a combustion device carried on said supporting frame, said combustion device comprising an inlet port for connection with the fuel supply, an exhaust port, and a combustion chamber communicating said inlet port with said exhaust port, said inlet port enabling the fuel from the fuel supply to flow into said combustion chamber for continuous combustion therein to create an exhaust gas within said combustion chamber;

said combustion device further comprising a catalyst element disposed within said combustion chamber, said catalyst element having a catalyst body with a plurality of essentially linear elongated conduits for enabling the exhaust gas created in said combustion chamber to flow therethrough towards said exhaust port, said catalyst body including a catalytically active material that, during operation, converts carbon monoxide in said exhaust gas to carbon dioxide as said exhaust gas flows through said elongated conduits;

an exhaust outlet carried on said frame, said exhaust outlet being communicated with the exhaust port of said combustion device and being configured to allow said exhaust gas to flow outwardly through said exhaust outlet so that insects attracted to the carbon dioxide in said exhaust gas will fly towards said exhaust outlet;

an insect inlet communicated with said insect trap chamber to enable flying insects to enter said trap chamber through paid insect inlet; and a vacuum device communicated to said insect inlet, said vacuum device being constructed and arranged to draw insects attracted to said exhaust outlet through said insect inlet and into said insect trap chamber;

wherein said combustion device further comprises turbulence reducing structure disposed within said combustion chamber upstream of said catalyst element, said turbulence reducing structure having a plurality of apertures oriented in the same general direction as the conduits of said catalyst body, skid apertures being configured to straighten the flow of fuel from said inlet port to thereby reduce turbulence in said fuel;

a sleeve, said catalyst element and said turbulence reducing structure being received in said sleeve.

63. A flying insect trapping system according to claim 62, wherein said sleeve is lined internally with insulating material.

64. A flying insect trapping system according to claim 63, wherein said sleeve is metal.

65. A flying insect trapping system according to claim 59, further comprising a sleeve, said catalyst element, said catalytically inactive body and said relatively thin diffuser plate being received in said sleeve.

66. A flying insect trapping system according to claim 65, wherein said sleeve is lined internally with insulating material.

67. A flying insect trapping system according to claim 66, wherein said sleeve is metal.

* * * * *